United States Patent
Shinmen et al.

(10) Patent No.: US 12,474,877 B2
(45) Date of Patent: Nov. 18, 2025

(54) OUTPUT APPARATUS

(71) Applicant: SONY GROUP CORPORATION, Tokyo (JP)

(72) Inventors: Naoki Shinmen, Tokyo (JP); Go Igarashi, Tokyo (JP); Kohei Asada, Tokyo (JP); Yoshiyuki Kuroda, Tokyo (JP); Masaki Kamata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 149 days.

(21) Appl. No.: 18/246,628

(22) PCT Filed: Sep. 30, 2021

(86) PCT No.: PCT/JP2021/036083
§ 371 (c)(1),
(2) Date: Mar. 24, 2023

(87) PCT Pub. No.: WO2022/075168
PCT Pub. Date: Apr. 14, 2022

(65) Prior Publication Data
US 2023/0367531 A1    Nov. 16, 2023

(30) Foreign Application Priority Data
Oct. 7, 2020    (JP) ................ 2020-170137

(51) Int. Cl.
*H04R 1/02*    (2006.01)
*G06F 1/16*    (2006.01)
(Continued)

(52) U.S. Cl.
CPC .............. *G06F 3/14* (2013.01); *G06F 1/1605* (2013.01); *G06F 3/016* (2013.01); *H04R 1/02* (2013.01);
(Continued)

(58) Field of Classification Search
CPC .......... G06F 3/14; G06F 1/1605; G06F 3/016
See application file for complete search history.

(56) References Cited

U.S. PATENT DOCUMENTS 10,191,547 B2 *   1/2019   Kuwabara ............... G06F 3/016
12,185,043 B2 *   12/2024  You ........................ H04R 17/00
(Continued)

FOREIGN PATENT DOCUMENTS

JP    56-093499 A    7/1981
JP    2006-115167 A  4/2006
(Continued)

OTHER PUBLICATIONS

International Search Report and Written Opinion of PCT Application No. PCT/JP2021/036083, issued on Dec. 21, 2021, 11 pages of ISRWO.

(Continued)

*Primary Examiner* — Simon King
(74) *Attorney, Agent, or Firm* — CHIP LAW GROUP

(57) ABSTRACT

There is provided an output apparatus that includes one or more display panels, a support member, and an actuator section. The one or more display panels are capable of displaying an image. The support member includes a support portion for supporting the respective one or more display panels. The actuator section is disposed between the one or more display panels and the support portion and vibrates the respective one or more display panels. In this output apparatus, an image is output by the one or more display panels. Further, the actuator section is disposed between the display panels and the support portion of the support member, and the display panels are vibrated.

20 Claims, 12 Drawing Sheets

(51) Int. Cl.
*G06F 3/01* (2006.01)
*G06F 3/14* (2006.01)

(52) U.S. Cl.
CPC ...... *H04R 2440/05* (2013.01); *H04R 2499/15* (2013.01)

(56) References Cited

U.S. PATENT DOCUMENTS

| | | | | |
|---|---|---|---|---|
| 2013/0039526 | A1* | 2/2013 | Inoue | G10K 9/13 381/386 |
| 2013/0229384 | A1* | 9/2013 | Adachi | G06F 3/041 345/174 |
| 2016/0162113 | A1* | 6/2016 | Araki | G06F 3/016 345/173 |
| 2017/0280249 | A1* | 9/2017 | Choi | H04R 3/14 |
| 2017/0289694 | A1* | 10/2017 | Choi | G02F 1/1333 |
| 2019/0004566 | A1 | 1/2019 | Lee | |
| 2019/0037164 | A1* | 1/2019 | Kim | H04R 17/005 |
| 2019/0149908 | A1* | 5/2019 | Kim | H04R 1/2826 381/388 |
| 2020/0007967 | A1 | 1/2020 | Kim | |
| 2020/0160760 | A1* | 5/2020 | Park | G09F 9/301 |
| 2020/0167122 | A1* | 5/2020 | Lee | G06F 3/16 |
| 2020/0213699 | A1* | 7/2020 | You | H04R 1/028 |
| 2020/0213764 | A1 | 7/2020 | Lee | |
| 2020/0280796 | A1* | 9/2020 | Lee | H04R 9/025 |
| 2020/0301194 | A1 | 9/2020 | Yoon et al. | |
| 2021/0014590 | A1* | 1/2021 | Ha | H04R 9/06 |
| 2022/0091691 | A1* | 3/2022 | Han | G06F 3/04166 |
| 2022/0111418 | A1* | 4/2022 | Takahashi | H02K 33/02 |
| 2022/0153137 | A1* | 5/2022 | Dünninger | B60K 35/10 |

FOREIGN PATENT DOCUMENTS

| | | |
|---|---|---|
| JP | 2007-519292 A | 7/2007 |
| JP | 2009-077366 A | 4/2009 |
| JP | 2009-100223 A | 5/2009 |
| JP | 4655243 B2 | 3/2011 |
| JP | 6237768 B2 | 11/2017 |
| JP | 2018-110369 A | 7/2018 |
| KR | 20060037354 A | 5/2006 |
| KR | 20200061195 A | 6/2020 |
| WO | WO-2019212089 A1 | 11/2019 |

OTHER PUBLICATIONS

Office Action for KR Patent Application No. 10-2023-7009649, issued on Aug. 14, 2025, 11 pages.

* cited by examiner

OUTPUT APPARATUS

CROSS REFERENCE TO RELATED APPLICATIONS

This application is a U.S. National Phase of International Patent Application No. PCT/JP2021/036083 filed on Sep. 30, 2021, which claims priority benefit of Japanese Patent Application No. JP 2020-170137 filed in the Japan Patent Office on Oct. 7, 2020. Each of the above-referenced applications is hereby incorporated herein by reference in its entirety.

TECHNICAL FIELD

The present technology relates to an output apparatus capable of outputting an image and sound.

BACKGROUND ART

In the speaker system described in Patent Literature 1, an actuator is attached to a frame member or a front panel connected to a display panel. When the display panel and the actuator drive, an image and sound are output (paragraphs [0032] to [0036] and [0039] of the specification, FIG. 1, and the like of Patent Literature 1).

In the sound output apparatus described in Patent Literature 2, an actuator is installed on a frame plate-shaped (picture frame-shaped) bezel attached around a display panel. When the display panel and the actuator drive, an image and sound are output (paragraphs [0014], [0015], and [0022] of the specification, FIG. 4, and the like of Patent Literature 2).

CITATION LIST

Patent Literature

Patent Literature 1: Japanese Patent No. 4655243
Patent Literature 2: Japanese Patent No. 6237768

DISCLOSURE OF INVENTION

Technical Problem

There is a demand for a technology capable of outputting an image and sound with high quality in an output apparatus capable of outputting an image and sound.

In view of the circumstances as described above, it is an object of the present technology to provide an output apparatus capable of outputting an image and sound with high quality.

Solution to Problem

In order to achieve the above-mentioned object, an output apparatus according to an embodiment of the present technology includes: one or more display panels; a support member; and an actuator section.

The one or more display panels are capable of displaying an image.

The support member includes a support portion for supporting the respective one or more display panels.

The actuator section is disposed between the one or more display panels and the support portion and vibrates the respective one or more display panels.

In this output apparatus, the one or more display panels output an image. Further, the actuator section is disposed between the display panels and the support portion of the support member, and the display panel is vibrated. As a result, it is possible to output an image and sound with high quality.

The support member may support the one or more display panels via the actuator section.

Each of the one or more display panels may have a display surface for displaying the image and a back surface portion on a side opposite to the display surface. In this case, the actuator section may include one or more actuators that are prepared for the respective one or more display panels and are connected to the back surface portion of the respective one or more display panels. Further, the support portion may fix and hold the one or more actuators.

The output apparatus may further include a fixing mechanism for fixing the one or more actuators to the support portion.

The fixing mechanism may include a fastening member. In this case, the one or more actuators may be fixed to the support portion by fastening with the fastening member.

The fixing mechanism may include a magnet. In this case, the one or more actuators may be fixed to the support portion by magnetic force of the magnet.

The one or more actuators may each be an electromagnetic actuator, a piezoelectric actuator, or a magnetostrictive actuator.

The one or more actuators may each be an electromagnetic actuator that includes a magnetic circuit. In this case, the fixing mechanism may include a magnet that is connected to the electromagnetic actuator and has an orientation of a magnetic pole set in accordance with a configuration of the magnetic circuit.

The magnet connected to the electromagnetic actuator may constitute the magnetic circuit.

The output apparatus may further include a connection mechanism for connecting the one or more actuators to the display panel.

The one or more actuators may each be an electromagnetic actuator and may each include a coil and a bobbin around which the coil is wound. In this case, the connection mechanism may include a connection member for connecting the bobbin to the display panel.

The one or more actuators may each be formed to be attachable/detachable to/from the display panel.

The one or more actuators may include a plurality of actuators. In this case, the actuator section may include a frame member that holds the plurality of actuators in a predetermined positional relationship.

Each of the plurality of actuators may be attachably/detachably screwed to the back surface portion of the display panel. In this case, the frame member may rotatably hold the plurality of actuators.

The one or more actuators may each be connected to a position of a node of natural vibration generated in the display panel.

The output apparatus may further include a reinforcing member connected to the back surface portion of the display panel.

The output apparatus may further include a detection section and a drive control section.

The detection section detects a vibration state of the display panel.

The drive control section generates, on the basis of the detected vibration state of the display panel, a drive signal for driving each of the one or more actuators.

The one or more display panels may include a plurality of display panels having display surfaces for displaying the image, the display surfaces being two-dimensionally arranged. In this case, a structure for reducing friction may be formed between end surfaces adjacent to each other, of display panels adjacent to each other of the plurality of display panels.

The one or more display panels may include a plurality of display panels having display surfaces for displaying the image, the display surfaces being two-dimensionally arranged. In this case, a structure that reduces a contact area may be formed between end surfaces adjacent to each other, of display panels adjacent to each other of the plurality of display panels.

The output apparatus may further include a plurality of display units each including the one or more display panels, the actuator section, and the support member.

MODE(S) FOR CARRYING OUT THE INVENTION

Hereinafter, an embodiment according to the present technology will be described with reference to the drawings.

Configuration Example of Display Apparatus

Figure 1:
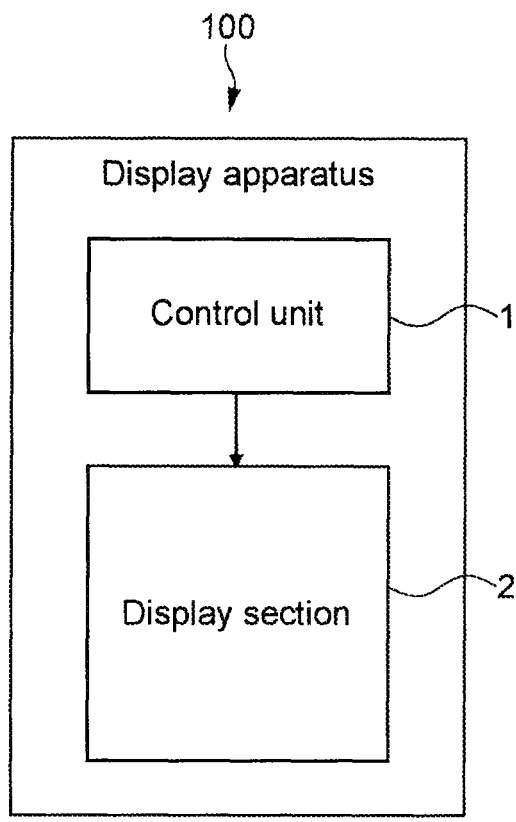
FIG. 1 is a block diagram showing a configuration example of a display apparatus according to an embodiment of the present technology.

FIG. 1 is a block diagram showing a configuration example of a display apparatus 100 according to an embodiment of the present technology.

The display apparatus 100 is an apparatus capable of outputting an image and sound and functions as an embodiment of the output apparatus according to the present technology.

In the present disclosure, the image includes both a still image and a moving image (video).

The display apparatus 100 includes a control section 1 and a display section 2.

The control section 1 includes hardware necessary for configurating a computer, e.g., a processor such as a CPU, a GPU, and a DSP, a memory such as a ROM and a RAM, and a storage device such as an HDD. For example, the CPU or the like loads the program according to the present technology stored in the ROM or the like in advance into the RAM and executes the program, thereby controlling various operations such as display of an image by the display apparatus 100.

The configuration of the control section 1 is not limited, and arbitrary hardware and software may be used. It goes without saying that hardware such as an FPGA and an ASIC may be used. Further, the position where the control section 1 is formed is not limited and may be arbitrarily designed. The control section 1 can also be referred to as a system controller.

The program is installed on the display apparatus 100 through, for example, various recording media. Alternatively, the program may be installed via the Internet or the like. The type and the like of the recording medium on which the program is recorded are not limited, and an arbitrary computer-readable recording medium may be used. For example, an arbitrary computer-readable non-transient recording medium may be used.

[Display Section]

Figure 2:
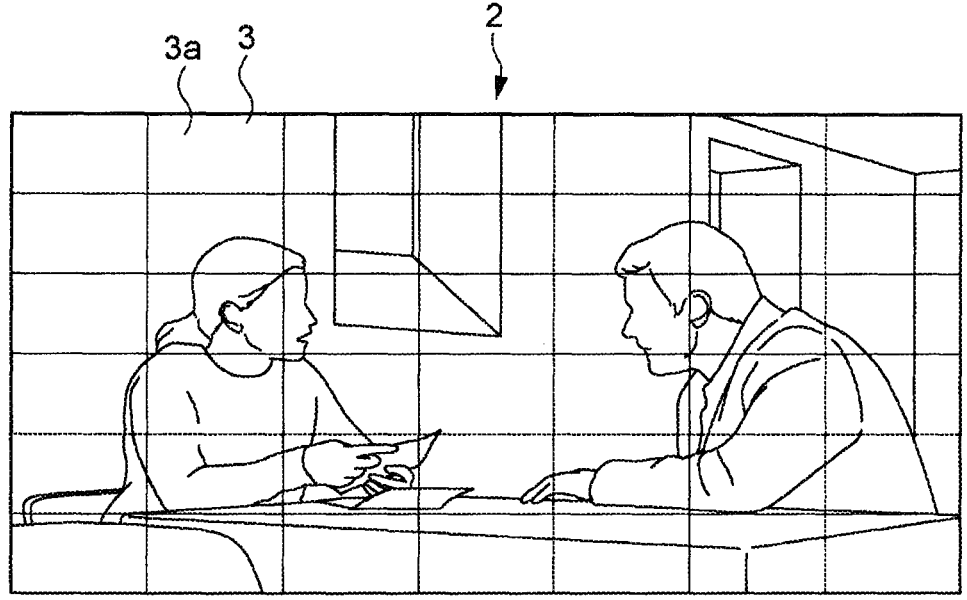
FIG. 2 is a schematic diagram showing a configuration example of a display section.

FIG. 2 is a schematic diagram showing a configuration example of the display section 2.

In this embodiment, the display section 2 includes a plurality of display units 3.

Each of the plurality of display units 3 has an image display surface 3a capable of displaying an image. As shown in FIG. 2, the plurality of display units 3 is installed such that the image display surfaces 3a are arranged in a two-dimensional grid pattern. As a result, it is possible to display an image on a large screen.

The control section 1 controls the operation of each of the display units 3 such that a desired image such as one large image is displayed on the image display surfaces 3a of the plurality of display units 3.

The display section 2 shown in FIG. 2 functions as a display system. An arbitrary number of display units 3 formed as units can be arranged in the display section 2 in an arbitrary arrangement configuration, and the display section 2 can be used as a scalable display system.

Note that the display units 3 can also be referred to as a cabinet or a display module.

In the present disclosure, expressions such as the unit and the module are both expressions that represent one component, and there is no clear difference between them. Mainly, an attachable/detachable and interchangeable part configured to be capable of exhibiting a predetermined function is expressed as a unit or a module.

As illustrated in FIG. 2, the right and left direction and the up-and-down direction when viewing the display section 2 from the front are respectively defined as an X direction and a Y direction in the following description. Further, the depth direction (direction perpendicular to the image display surface 3a) is defined as a Z direction in the following description.

Further, the orientation of the arrow of the X direction is described as the right side, and the side opposite thereto is described as the left side. Further, the orientation of the arrow of the Y direction is described as the upper side, and the side opposite thereto is described as the lower side. Further, the orientation of the arrow of the Z direction is described as the front side, and the side opposite thereto is described as the rear side.

It goes without saying that the orientation in which the display apparatus 100 is used, and the like are not limited in applying the present technology.

In the example shown in FIG. 2, a total of 42 display units 3, seven in the X direction (right and left direction) and six in the Y direction (up-and-down direction), are arranged. The number of the plurality of display units 3 is not limited.

Further, even in the case where the number of the display units 3 is one, the present technology is applicable. That is, the present technology is applicable in the case where one or more display units 3 are arranged.

[Display Unit]

Figure 3:
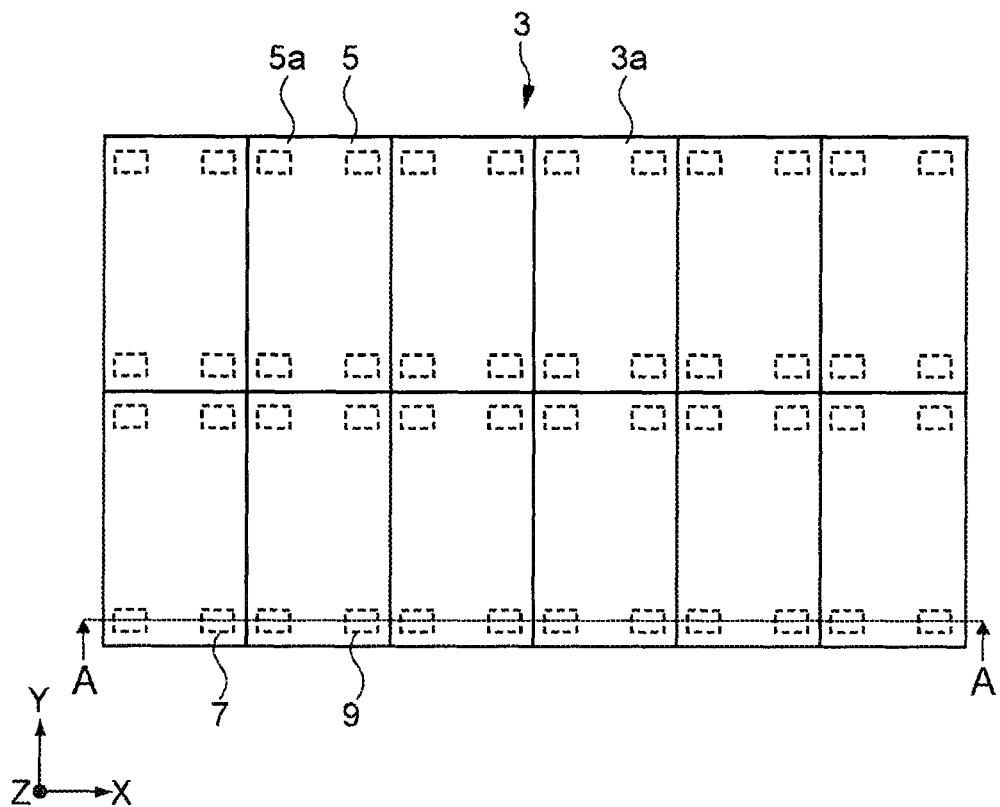
FIG. 3 is a diagram of a display unit as viewed from the front.
Figure 4:
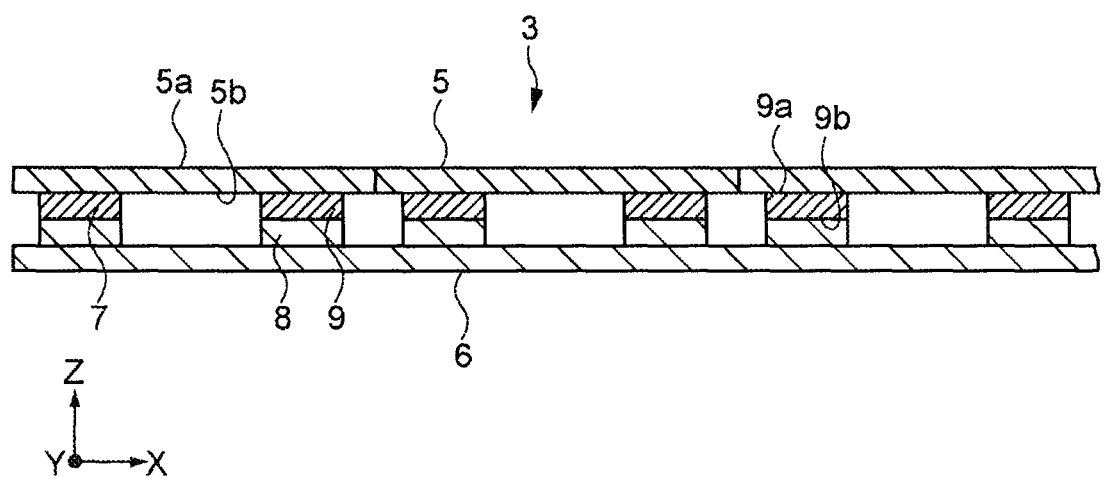
FIG. 4 is a diagram showing part of a cross section taken along the line A-A in FIG. 3.

FIG. 3 and FIG. 4 are each a schematic diagram showing a configuration example of the display unit 3.

FIG. 3 is a diagram of the display unit 3 as viewed from the front along the Z direction.

FIG. 4 is a diagram showing part of a cross section taken along the line A-A in FIG. 3.

In this embodiment, the display unit 3 includes a plurality of display panels 5, a unit substrate 6, and an actuator section 7.

The display panel 5 is capable of displaying an image.

For example, the display panel 5 is realized by mounting a light source element on a display substrate (which are not shown). For example, an LED panel on which a minute LED (Light Emitting Diode) is mounted as a light source element is used as the display panel 5.

In addition, a display panel having an arbitrary configuration, such as an organic EL panel and an LD panel may be used as the display panel 5.

Note that the shape, the size, and the like of the display panel 5 are mainly defined by the shape and the size of the display substrate. Further, for example, disposing the display panel 5 at a predetermined position corresponds to disposing the display substrate included in the display panel 5 at a predetermined position.

As shown in FIG. 4, in this embodiment, the display panel 5 has a flat plate shape and function as a so-called flat panel display. Further, the shape of the display panel 5 as viewed from the front is a rectangular shape.

The display panel 5 has a display surface 5a for displaying an image and a back surface portion 5b on the side opposite to the display surface. The plurality of display panels 5 are arranged such that the display surfaces 5a are arranged in a two-dimensional grid pattern. The plurality of two-dimensionally arranged display surfaces 5a form the image display surface 3a of one display unit 3.

The specific configuration of the display panel 5 is not limited and may be arbitrarily designed. For example, a reinforcing member or the like may be provided on the rear side of the display substrate. In this case, the display substrate and the reinforcing member form the back surface portion 5b of the display panel 5.

Note that even in the case where the number of the display panels 5 included in the display unit 3 is one, the present technology is applicable. That is, the present technology is applicable in the case where one or more display panels 5 are arranged.

The unit substrate 6 includes a support portion 8 for supporting each of the plurality of display panels 5.

The support portion 8 is prepared for each of the plurality of display panels 5 and is provided at a predetermined position with respect to the back surface portion 5b.

In this embodiment, the support portions 8 are provided at four corner positions of the back surface portion 5b of the display panel 5.

The unit substrate 6 corresponds to an embodiment of a support member according to the present technology. Note that the unit substrate 6 can be referred to as a cabinet substrate or a cabinet member.

The unit substrate 6 is formed of, for example, a metal such as aluminum. In addition, the material of the unit substrate 6 is not limited and an arbitrary material may be used.

The actuator section 7 is provided between the plurality of display panels 5 and the support portion 8 and vibrates each of the plurality of display panels 5.

As shown in FIG. 3 and FIG. 4, the actuator section 7 is prepared for each of the plurality of display panels 5, and the actuator sections 7 include one or more actuators 9 connected to the back surface portion 5b of the display panel 5.

In this embodiment, four actuators 9 are disposed between the support portions 8 provided at four corner positions of the back surface portion 5b and the back surface portion 5b. That is, the four actuators 9 are connected at the four corner positions of the back surface portion 5b. Therefore, the actuator sections 7 include the actuators 9 whose number is the number of display panels×4.

The number of the actuators 9 that are prepared for the corresponding display panel 5 and are connected to the back surface portion 5b is not limited, and the actuators 9 whose number is an arbitrary number equal to or greater than one may be connected. Further, also the positions at which the actuators 9 are connected are not limited and may be arbitrarily designed.

As each of the actuators 9, for example, an electromagnetic (electrodynamic) actuator that includes a permanent magnet and a voice coil, or the like and generates vibration by the action of a magnetic circuit is used. The present technology is not limited thereto, and an arbitrary actuator such as a piezoelectric actuator using a piezoelectric element and a magnetostrictive actuator using a magnetostrictive vibration element may be used.

As shown in FIG. 4, the unit substrate 6 supports each of the plurality of display panels 5 via the actuator sections 7. Further, the support portion 8 fixes and holds the corresponding actuator 9.

Therefore, it can also be said that the support portion 8 is a component that supports the display panel 5 via the actuator 9. Further, it can also be said that the support portion 8 is a component that fixes and holds the actuator 9 connected to the display panel 5.

The specific configuration of the support portion 8 is not limited, and an arbitrary configuration capable of supporting the display panel 5 via the actuator 9, in other words, an arbitrary configuration capable of fixing and holding the actuator 9 may be adopted.

A fixing mechanism may be used to fix the actuators 9 to the support portions 8.

The fixing mechanism has an arbitrary configuration for fixing the plurality of actuators 9 to the support portions 8. For example, a configuration for realizing an arbitrary fixing method such as fastening with a fastening member such as a screw, attraction by magnetic force, and mechanical connection such as fitting using a snap-fit (fitting claw) or the like) may be adopted as the fixing mechanism.

Further, a connection mechanism may be used to connect the one or more actuators 9 to the display panel 5. The connection mechanism has an arbitrary configuration for connecting the actuators 9 to the display panel 5.

A specific example of the fixing mechanism and the connection mechanism will be described below.

As shown in FIG. 4, a movable portion (movable end) 9a of the actuator 9 is connected to the display panel 5. Further, a non-movable portion (fixed end) 9b of the actuator 9 is fixed to the support portion 8 of the unit substrate 6. The movable end 9a of the actuator 9 is displaced (vibrated) with respect to the fixed end 9b, thereby making it possible to vibrate the display panel 5.

As described above, by disposing the actuators 9 between the display panel 5 and the unit substrate 6, a vibration mechanism for vibrating the display panel 5 is formed. Then, a sound generating mechanism regarding the display panel 5 itself as a diaphragm is formed.

In this embodiment, the four actuators 9 uniformly vibrate the display panel 5 having a flat plate shape along the Z direction. As a result, it is possible to radiate a wavefront close to a plane wave to a viewer using the display surface 5a as a radiation surface. As a result, it is possible to cause the display surface 5a to function as a flat speaker.

In the case where a wavefront close to a plane wave can be formed by the display surface 5a, directivity different from that of a cone-shaped diaphragm that forms a wavefront close to a spherical wave is provided.

In an ideal plane wave, the directivity is sharp and sound is radiated only in the forward direction perpendicular to the radiation surface. Further, when considering one point away from the speaker, a plane wave has less attenuation of sound pressure according to the distance from the speaker (only attenuation due to viscoelasticity of air) as compared with a spherical wave that radiates in a spherical shape and needs to consider diffusion according to the distance.

For this reason, a flat speaker is very effective when sound is desired to be heard only in a specific range or sound is desired to be heard by a distant listener, for example.

It goes without saying that the application of the present technology is not limited to the case where a wavefront close to a plane wave is radiated.

A specific configuration example of the display units 3 will be described.

Figure 5B:
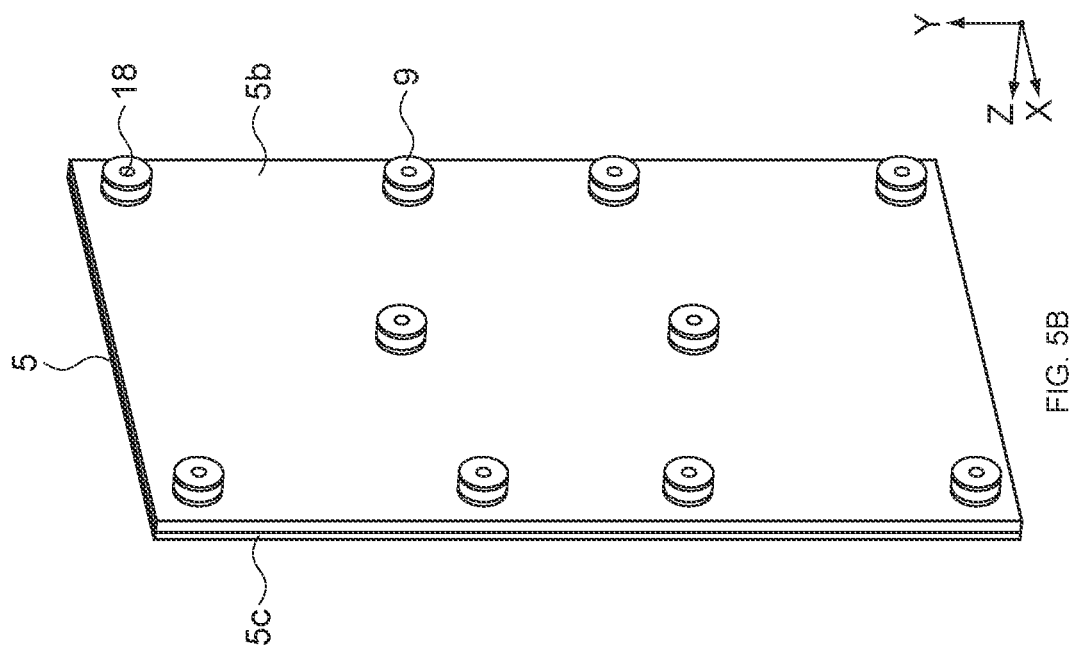
FIGS. 5A and 5B are schematic diagrams showing a display panel and a plurality of actuators.
Figure 5A:
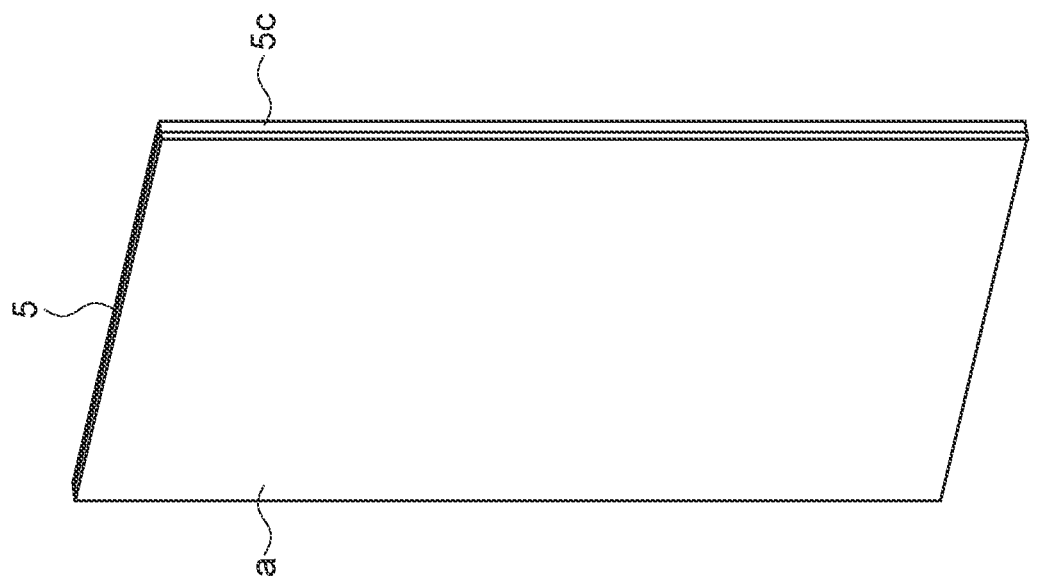

FIGS. 5A and 5B are schematic diagrams showing the display panel 5 and the plurality of actuators 9.

Figure 6:
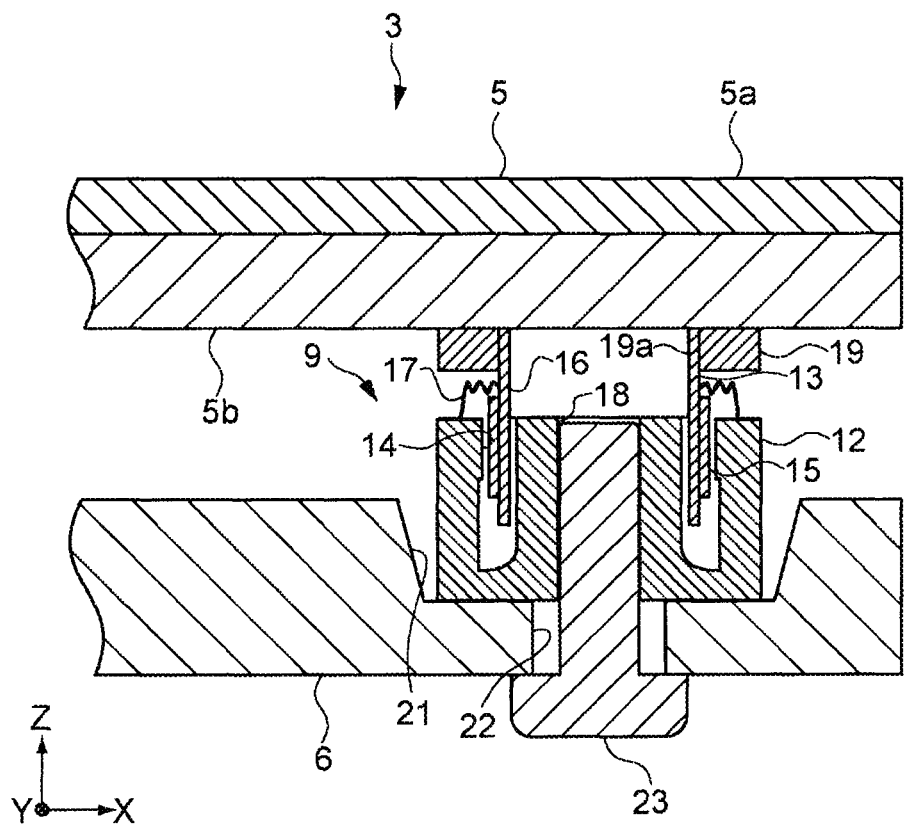
FIG. 6 is a cross-sectional view of a portion of the display unit where an actuator is installed.

FIG. 6 is a cross-sectional view of a portion of the display unit 3 where the actuator 9 is installed.

As shown in FIGS. 5A and 5B, the display panel 5 has the display surface 5a and the back surface portion 5b. Further, the display panel 5 has four end surfaces 5c that are the upper, lower, right, and left side surfaces.

Although not shown, a plurality of LEDs is arranged in a two-dimensional grid pattern on the display surface 5a. For example, LED groups (RGB) of three primary colors of RGB are two-dimensionally arranged, each of the LED groups being one pixel. It goes without saying that the present technology is not limited to such a configuration.

Figure 10:
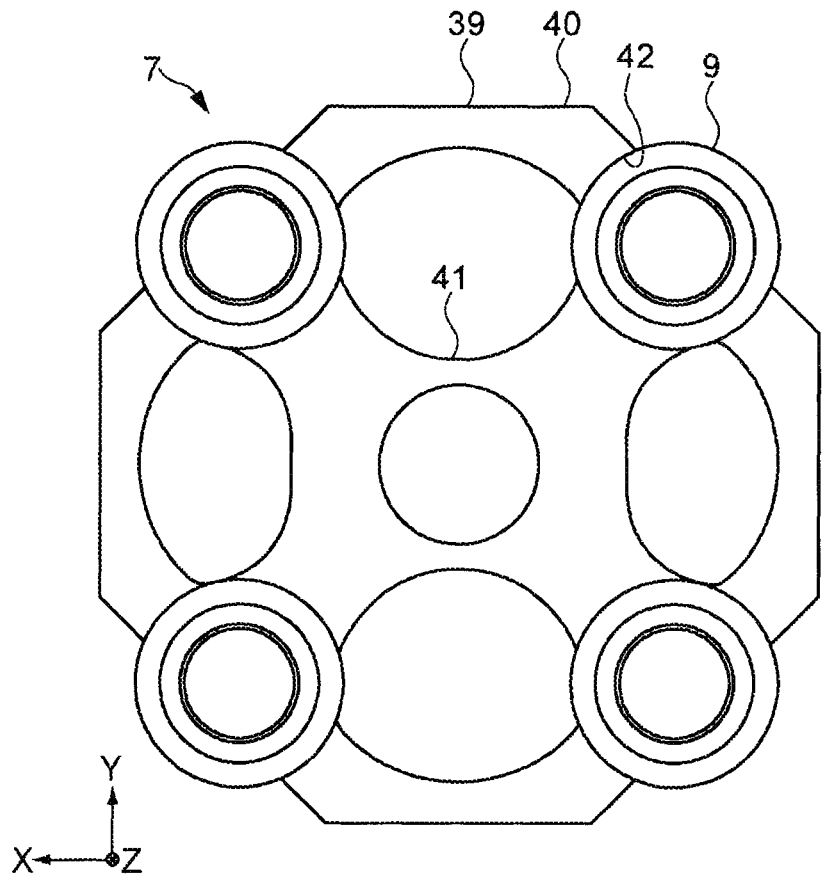
FIG. 10 is a schematic diagram showing a configuration example of a frame member.

As shown in FIG. 5B, 10 actuators 9 are connected to the back surface portion 5b. In the example shown in FIG. 5B, the actuators 9 are connected to the four corners of the back surface portion 5b. Further, two actuators 9 are connected near the center of each of the two long sides of the back surface portion 5b. Further, two actuators 9 are connected along the longitudinal direction at the central position of the back surface portion 5b in the lateral direction.

The number and positions of the actuators 9 can be arbitrarily designed.

As shown in FIG. 6, in this embodiment, an electromagnetic actuator 9 is used.

The actuator 9 incudes a fixing unit 12 and a movable unit 13.

The fixing unit 12 includes, for example, a magnetic circuit that includes a member formed of a magnetic material such as a yoke, a pole piece, and a plate, and a permanent magnet. Further, a magnetic gap 14 is formed in the fixing unit 12.

The movable unit 13 includes a voice coil 15 and a drive bobbin 16 around which the voice coil 15 is wound.

The movable unit 13 is disposed with respect to the fixing unit 12 such that the voice coil 15 is inserted into the magnetic gap 14 of the fixing unit 12.

Further, the movable unit 13 is connected to the fixing unit 12 by a damper 17. The damper 17 connects the movable unit 13 to the fixing unit 12 such that the movable unit 13 can be displaced. That is, the damper 17 connects the movable unit 13 to the fixing unit 12 without interrupting vibration of the movable unit 13.

Further, in this embodiment, each of the fixing unit 12 and the movable unit 13 is formed in a hollow cylindrical shape. Then, a screw hole 18 is formed in the central hollow portion.

The end portion of the drive bobbin 16 is connected to the back surface portion 5b of the display panel 5 by a connection mechanism.

In this embodiment, as the connection mechanism, a connection member 19 that connects the drive bobbin 16 to the display panel 5 is used. The connection member 19 functions as a member for increasing the contact area for connecting the back surface portion 5b of the display panel 5 and the drive bobbin 16 to each other. The connection member 19 can also be referred to as a coupler.

In this embodiment, as the connection member 19, a member having a flat plate shape in which a through hole 19a is formed in the center is used. The end portion of the drive bobbin 16 is inserted into the through hole 19a in the center, and the connection member 19 is connected to the outer periphery of the drive bobbin 16. When the connection member 19 is connected to the back surface portion 5b by adhesion or the like, the movable unit 13 is connected to the back surface portion 5b.

The configuration of the connection member 19 is not limited, and an arbitrary configuration may be adopted. For example, a stepped member having a flange formed at the tip of a hollow cylindrical shape may be formed as the connection member 19. The inner surface of the cylindrical shape is connected to the outer periphery of the drive bobbin 16. Then, an upper surface portion of the flange is connected to the back surface portion 5b of the display panel 5.

Alternatively, a member having a flat plate shape is used as the connection member 19. The drive bobbin 16 is connected to the lower surface of the connection member 19 and the back surface portion 5b of the display panel 5 is connected to the upper surface of the connection member 19.

Alternatively, the connection member 19 having a circular shape or a ring shape may be fitted and connected to the inner peripheral side of the drive bobbin 16. The back surface portion 5b of the display panel 5 is connected to the upper surface of the connection member 19. In addition, an arbitrary configuration may be adopted.

The connection member 19 is formed of, for example, a metal material such as aluminum. In addition, an arbitrary material may be used.

In the example shown in FIG. 6, the voice coil 15 and the drive bobbin 16 respectively correspond to an embodiment of a coil and a bobbin according to the present technology.

As shown in FIG. 6, a support recessed portion 21 is formed in the unit substrate 6. The fixing unit 12 of the actuator 9 is disposed in the support recessed portion 21. A through hole 22 is formed in the center of the support recessed portion 21. The fixing unit 12 is disposed in the support recessed portion 21 such that the screw hole 18 formed in the central portion of the actuator 9 is positioned in this through hole 22.

A screw 23 is fitted into the screw hole 18 formed in the actuator 9 so as to pass through the through hole 22 formed in the support recessed portion 21. As a result, the actuator 9 is fixed to the support recessed portion 21 of the unit substrate 6. That is, in this embodiment, the plurality of actuators 9 is fixed to the unit substrate 6 by fastening with a fastening member.

In the example shown in FIG. 6, the support recessed portion 21 corresponds to the support portion 8 shown in FIG. 3. Further, the screw hole 18 formed in the central portion of the actuator 9, the through hole 22 formed in the support recessed portion 21, and the screw 23 realize a fixing mechanism.

Note that the support portion 8 and a support mechanism can be collectively regarded as a component for supporting the display panel 5 via the actuator 9.

The outer shape and size of the fixing unit 12 as viewed from the Z direction and the outer shape and size of the support recessed portion 21 as viewed from the Z direction may be substantially the same. Then, the fixing unit 12 may be fitted into and attached to the support recessed portion 21 along the Z direction. As a result, it is possible to stably fix the fixing unit 12 to the unit substrate 6.

In this case, the outer shape of the fixing unit 12 and the support recessed portion 21 as viewed from the Z direction is made a shape such as a hexagonal shape, e.g., a nut. As a result, it is possible to sufficiently prevent, when fixing the fixing unit 12 with the screw 23, the fixing unit 12 from rotating. As a result, the workability at the time of mounting the fixing unit 12 is improved.

By driving the actuator 9, it is possible to vibrate the voice coil 15 and the drive bobbin 16 along the Z direction by electromagnetic induction. As a result, it is possible to transmit vibration along the Z direction to the display panel 5 via the connection member 19.

The 10 actuators 9 are driven in synchronization with each other. That is, the 10 actuators 9 are driven such that the same vibration is transmitted to the display panel 5 along the Z direction. As a result, uniform vibration of the display panel 5 is realized, and high acoustic characteristics are exhibited.

Figure 7:
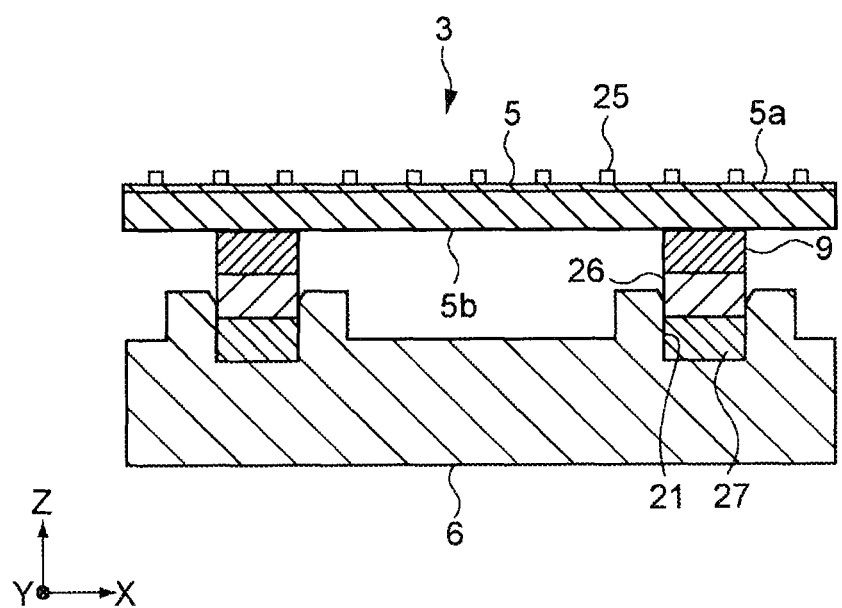
FIG. 7 is a cross-sectional view showing another configuration example of the display unit.

FIG. 7 is a cross-sectional view showing another configuration example of the display unit 3.

In the display unit 3 shown in FIG. 7, an LED panel on which LEDs 25 are mounted is used as the display panel 5.

The actuator 9 is connected to the back surface portion 5b of the display panel 5. The configuration of the actuator 9 may be arbitrarily designed.

A first magnet 26 is connected to the outer periphery of the actuator 9 on the bottom side. As the connection method, an arbitrary method such as adhesion may be adopted.

The support recessed portion 21 is formed in the unit substrate 6. Further, a second magnet 27 is installed in the support recessed portion 21. The second magnet 27 is fixed to the support recessed portion 21 by an arbitrary method such as adhesion.

The orientation of each of magnetic poles of the first magnet 26 and the second magnet 27 is set such that they are attracted to each other by magnetic force. When the first magnet 26 and the second magnet 27 are attracted to each other, the actuator 9 is fixed to the support recessed portion 21 of the unit substrate 6. That is, in this embodiment, the plurality of actuators 9 is fixed to the unit substrate 6 by magnetic force of the magnet.

In the example shown in FIG. 7, the support recessed portion 21 corresponds to the support portion 8. Further, the first magnet 26 and the second magnet 27 realize a fixing mechanism.

Note that instead of the first magnet 26 a magnetic material such as iron may be connected to the outer periphery of the actuator 9 on the bottom side. Then, the actuator 9 may be fixed to the unit substrate 6 by the attraction between the magnetic material and the second magnet 27.

Alternatively, instead of the second magnet 27, a magnetic material such as iron may be installed in the support recessed portion 21. Then, the actuator 9 may be fixed to the unit substrate 6 by the attraction between the first magnet 26 and the magnetic material.

Alternatively, the entire unit substrate 6 may be formed of a magnetic material such as iron and the first magnet 26 may be attracted to the unit substrate 6 itself to fix the actuator 9 to the unit substrate 6. In this case, a flat surface for fixing the first magnet 26, a projecting portion or a recessed portion for alignment, or the like may be formed on part of the unit substrate 6. The flat surface, the projecting portion, or the like functions as the support portion 8.

Figure 8:
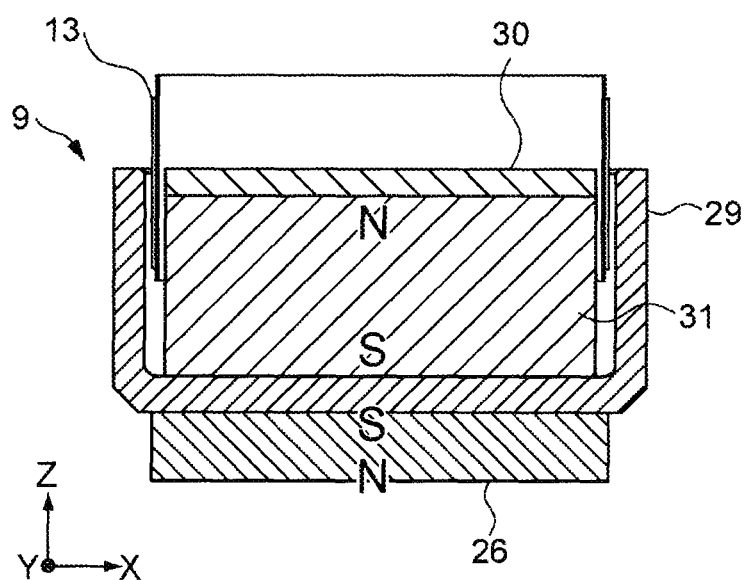
FIG. 8 is a cross-sectional view showing a configuration example in the case where a first magnet is connected to an electromagnetic actuator.

FIG. 8 is a cross-sectional view showing a configuration example in the case where the first magnet 26 is connected to the electromagnetic actuator 9.

The electromagnetic actuator 9 includes a yoke 29, a pole piece 30, and a magnet 31, and a magnetic circuit is formed to vibrate the movable unit 13.

In the example shown in FIG. 8, the first magnet 26 has an orientation of a magnetic pole set in accordance with the configuration of the magnetic circuit. Specifically, the orientation of the magnetic pole of the first magnet 26 is set so as to repel the magnet 31 such that the magnetic force of the magnetic circuit does not decrease. As a result, it is possible to prevent the installation of the first magnet 26 from adversely affecting the excitation force generated by the actuator 9.

Note that since the first magnet 26 is disposed in an orientation repelling the magnet 31, the first magnet 26 is firmly fixed to the outer periphery of the yoke 29 on the bottom side by adhesion or the like.

It goes without saying that in the case where the electromagnetic actuator 9 is used, it is also effective to fix the actuator 9 to the unit substrate 6 by a method different from fixing by magnetic force. Conversely, by appropriately setting the orientation of the magnetic pole of the first magnet 26, it is possible to realize the fixing to the unit substrate 6 by magnetic force even in the case where the electromagnetic actuator 9 is used.

The magnetic circuit of the electromagnetic actuator 9 may be formed by the first magnet 26. That is, the first magnet 26 may be used as a member for forming the magnetic circuit.

In this case, the first magnet 26 functions also as part of the actuator 9. Conversely, it can also be said that the member forming the actuator 9 realizes the fixing of the actuator 9 to the unit substrate 6. As a result, it is possible to reduce the number of parts and the cost of parts, for example, and miniaturize the apparatus.

It goes without saying that even in the case where another type of actuator 9 such as a piezoelectric actuator and a magnetostrictive actuator is used, the actuator 9 may be fixed to the unit substrate 6 using the member forming the actuator 9.

For example, a member formed of a magnetic material is used for the bottom portion of the actuator 9 and is attracted to the second magnet 26. Such a configuration may be adopted.

Figure 9A:
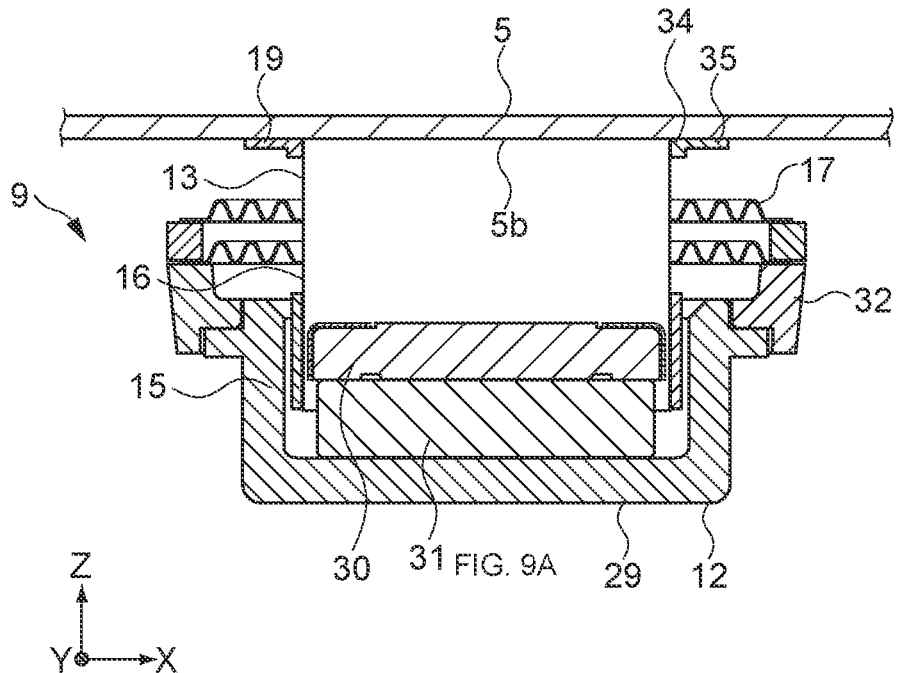
FIGS. 9A and 9B are schematic diagrams showing a configuration example of an electromagnetic actuator and a connection member.
Figure 9B:
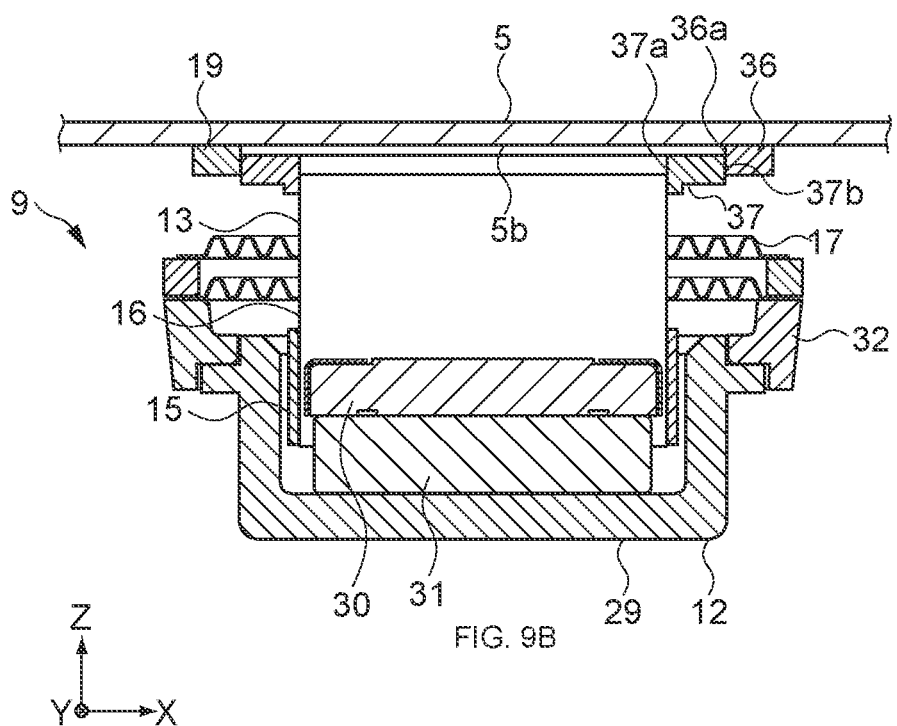

FIGS. 9A and 9B are schematic diagrams showing a configuration example of the electromagnetic actuator 9 and the connection member 19.

In the electromagnetic actuator 9 shown in FIGS. 9A and 9B, the yoke 29, the pole piece 30, the magnet 31, and a frame 32 constitute the fixing unit 12. The bottom side of the yoke 29 is fixed to the unit substrate 6.

The movable unit 13 includes the voice coil 15 and the drive bobbin 16.

Two dampers 17 are provided between the frame 32 of the fixing unit 12 and the drive bobbin 16. The dampers 17 connect the movable unit 13 to the fixing unit 12 such that the movable unit 13 is capable of vibrating.

Further, as shown in FIGS. 9A and 9B, the drive bobbin 16 is connected to the back surface portion 5*b* of the display panel 5 by the connection member 19.

In the example shown in FIG. 9A, the connection member 19 includes a hollow cylindrical shape portion 34 and a flange portion 35 connected to the end portion of the cylindrical shape portion 34, and is formed as a stepped member. The inner surface of the cylindrical shape portion 34 is connected to the outer periphery of the drive bobbin 16. Then, the upper surface of the flange portion 35 is connected to the back surface portion 5*b* of the display panel 5.

In the example shown in FIG. 9A, the drive bobbin 16 is fixed to the back surface portion 5*b* of the display panel 5 via the connection member 19 by adhesion or the like. As a result, it is possible to sufficiently suppress loss in transmission of vibration (driving force).

The connection member 19 can also be said to be a transmission member that transmits vibration generated by the actuator 9 to the display panel 5.

In the example shown in FIG. 9B, the connection member 19 includes a female screw member 36 and a male screw member 37.

The female screw member 36 is a member having a flat plate shape in which a screw hole 36*a* is formed in the center, and is connected to the back surface portion 5*b* of the display panel 5.

The male screw member 37 is a member having a flat plate shape in which a through hole 37*a* is formed in the center, and the end portion of the drive bobbin 16 is connected to the through hole 37*a*. Further, a screw thread 37*b* to be fitted into the screw hole 36*a* of the female screw member 36 is formed on the outer periphery of the male screw member 37.

In the example shown in FIG. 9B, the actuator 9 is formed as a module and is connected to the male screw member 37 (can be regarded as a module, including the male screw member 37). The actuator 9 is caused to rotate in a predetermined direction (e.g., clockwise) to fit the screw thread 37*b* of the male screw member 37 into the screw hole 36*a* of the female screw member 36. As a result, it is possible to connect the actuator 9 to the back surface portion 5*b* of the display panel 5.

The actuator 9 is caused to rotate in the opposite direction (e.g., counterclockwise) to release the fitting of the screw thread 37*b* of the male screw member 37 into the screw hole 36*a* of the female screw member 36. As a result, it is possible to detach the actuator 9 from the back surface portion 5*b* of the display panel 5.

As described above, the actuator 9 may be modularized and may be formed to be attachable/detachable to/from the back surface portion 5*b* of the display panel 5. As a result, for example, it is not necessarily need to replace, even in the case where the actuator 9 has failed, the entire display unit 3 including the relatively expensive display panel 5.

That is, it is possible to detach and replace only the failed actuator 9, making it possible to realize significant cost reduction. Note that the actuator 9 is attached/detached after the connection the actuator 9 and the unit substrate 6 is released. For example, the actuator 9 is attached/detached after the fitting with an engaging member as shown in FIG. 6 or the attraction by magnetic force as shown in FIG. 7 is released.

Note that in the case where the actuator 9 is formed to be attachable/detachable, it is desirable minimize backlash and play in order to prevent transmission loss of driving force and generation of abnormal noise.

In the example shown in FIG. 9B, each of the plurality of actuators 9 is attachably/detachably screwed to the back surface portion 5*b* of the display panel 5. That is, the actuators 9 are connected to the display panel 5 by screw fastening.

It goes without saying that the configuration and method for making the actuator 9 be formed to be attachable/detachable to/from the display panel 5 are not limited. An arbitrary configuration such as an arbitrary lock mechanism, fastening with a fastening member, and attraction by a magnet may be adopted.

Further, modularization of the actuator 9 and making the actuator 9 be formed to be attachable/detachable to/from the display panel 5 are not limited to the case where the electromagnetic actuator 9 is used. They can be realized even in the case of another type of actuator 9 such as a piezoelectric actuator and a magnetostrictive actuator.

For example, a piezoelectric element is used as the actuator 9, the piezoelectric element is connected to the connection member 19 (e.g., the male screw member 37) formed to be attachable/detachable as shown in FIG. 9B by adhesion or the like. Further, the piezoelectric element is directly connected to the first magnet 26 (or magnetic material) for realizing attraction by magnetic force as shown in FIG. 8 by adhesion or the like.

As a result, it is possible to form a module including pat of the connection member 19 (e.g., the male screw member 37), the piezoelectric element, and the first magnet 26 (or magnetic material). Further, it is possible to realize a configuration attachable/detachable to/from the display panel 5. Further, by employing this configuration using a piezoelectric element, it is possible to reduce the weight thickness of the actuator 9. As a result, it is possible to reduce the weight and size of the display unit 3.

[Frame Member]

FIG. 10 is a schematic diagram showing a configuration example of a frame member.

In the case where the plurality of actuators 9 is connected to each display panel 5, a frame member 39 may be used. The frame member 39 holds the plurality of actuators 9 in a predetermined positional relationship. The frame member 39 can also be called a sub-frame in the display unit 3.

In the example shown in FIG. 10, the frame member 39 includes a hollow outer frame portion 40 and a central rib portion 41.

The outer frame portion 40 has an octagonal outer shape as viewed from the Z direction and a holding portion 42 for holding the actuator 9 is formed on each of four side portions disposed alternately, of eight side portions. The central rib portion 41 is connected to the inner side of the outer frame portion 40 so as to connect the four holding portions 42 to each other.

In the example shown in FIG. 10, four actuators 9 are connected to each display panel 5 at positions symmetrical to the center. By using the frame member 39, it is possible to modularize the actuator section 7 including the four actuators 9 and exhibit high workability regarding connection of the actuator section 7, and the like.

By modularizing the actuator section 7 using the frame member 39, it is possible to not only position the actuator 9 in the X direction and the Y direction but also position each actuator 9 in the vibration direction (Z direction).

In the case of using the plurality of actuators 9, in order to achieve uniform vibration in parallel with respect to the display surface 5a of the display panel 5, the positioning of each actuator 9 in the vibration direction is important. For example, the positions of the vibration midpoints (vibration centers) of the plurality of actuators 9 vary, it is difficult to uniformly vibrate the display panel 5. As a result, the acoustic characteristics deteriorate.

By using the frame member 39, it is possible to easily align the positions of the midpoints of vibration of the respective actuators 9. Further, for example, it is also easy to set the respective actuators 9 in the frame member 39 such that the plane connecting the end portions of the actuators 9 on the side of the display panel 5 is positioned at the midpoint of the vibration of the respective actuators 9. As a result, it is possible to uniformly vibrate the display panel 5 and improve the acoustic characteristics.

Further, in order to uniformly vibrate the display panel 5, it is also important to match the individual vibration characteristics of the actuator 9. When the frame member 39 is used for modularization, by appropriately selecting and setting the actuators 9 matched for each individual, it is possible to easily realize the actuator section 7 with high quality, which is capable of uniformly and stably vibrate the display panel 5.

It is also possible to form the actuator section 7 modularized using the frame member 39 to be attachable/detachable to/from the display panel 5.

For example, by making each actuator 9 held by the frame member 39 be formed to be attachable/detachable to/from the display panel 5, it is possible to realize an attachable/detachable configuration of the modularized actuator section 7.

For example, as shown in FIG. 9B, a configuration in which the actuator 9 is attachably/detachably screwed to the display panel 5 is adopted. In this case, the frame member 39 rotatably holds the actuator 9.

That is, the rotation direction around the vibration direction (Z direction) is made not restricted while the position in the vibration direction is fixed. As a result, by causing each actuator 9 to rotate, it is possible to easily attach and detach the modularized actuator section 7. The configuration for rotatably holding the actuator 9 is not limited and an arbitrary configuration may be adopted.

In addition, the configuration of the frame member 39 is not limited, and may be arbitrarily designed on the basis of the number and attachment positions of the actuators 9, whether or not the actuators 9 is formed to be attachable/detachable, and the like. It goes without saying that the actuator 9 is not necessarily need to be screwed to the display panel 5, and an arbitrary configuration for holding each actuator 9 by the frame member 39 may be adopted in accordance with an arbitrary attachable/detachable configuration.

The material of the frame member 39 is not limited, and an arbitrary material, e.g., a metal material such as aluminum may be used.

[Attachment Position of Actuator 9]

The position where the actuator 9 is attached is a point at which the display panel 5 is driven by vibration (hereinafter, referred to as a drive point). Conversely, a position where the display panel 5 is desired to be driven can set as a drive point and the actuator 9 can be connected at the position of the set drive point.

For example, one drive point may be set at the center of the back surface portion 5b of the display panel 5, or the like. Further, by setting a plurality of drive points, driving force for vibrating the display panel 5 may be increased.

Here, setting of a drive point considering split vibration of the display panel 5 will be described.

The split vibration means that different vibration components are generated in a plurality of regions of the display panel 5 due to natural vibration and the display panel 5 behaves differently from uniform vibration.

In the case where split vibration occurs in the display panel 5, it often forms a peak or a dip in sound pressure in the resonance band and affects also the directivity. For these reasons, it is important to suppress split vibration for improving the performance of a flat speaker.

Figure 11:
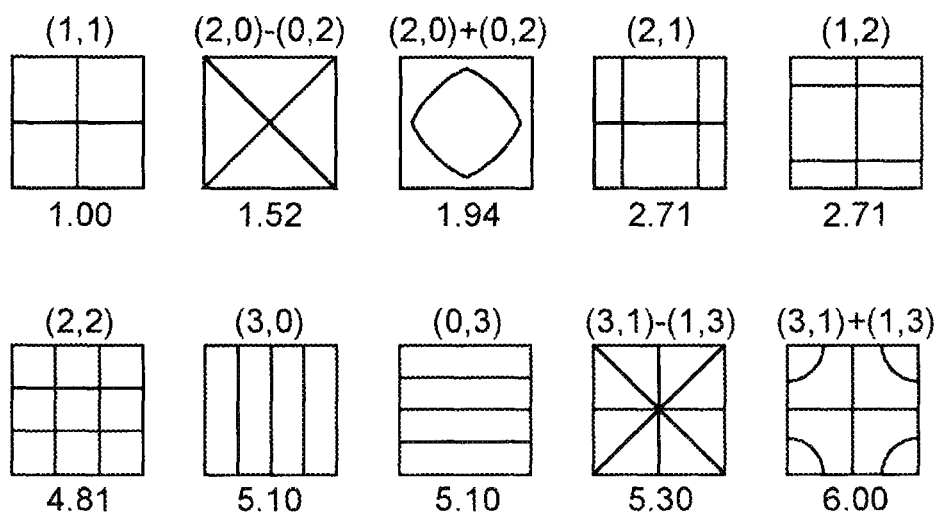
FIG. 11 is a schematic diagram showing an example of a vibration mode of natural vibration.

FIG. 11 is a schematic diagram showing an example of a vibration mode of natural vibration.

FIG. 11 illustrates 10 vibration modes including a basic mode of a square plate having a free end. The lower values in the figure are the frequencies relative to that of the basic mode.

In the natural vibration mode shown in FIG. 11, a line inside the square is a node of natural vibration. Then, the central portion of the region separated by the line is an antinode of the natural vibration.

For example, in the case where the display panel 5 is caused to uniformly vibrate, natural vibration in a vibration mode as illustrated in FIG. 11 can occur in accordance with the vibration frequency.

In this regard, a drive point is set at a position of a node of natural vibration that occurs in the display panel 5 and the actuator 9 is attached. For example, setting a drive point at a position of a node of natural vibration to be suppressed is advantageous in suppressing split vibration and realizing uniform vibration of the display panel 5. Further, setting drive points so as to be symmetrical with respect to the center of the display panel 5 is also advantageous in suppressing split vibration.

Note that in order to realize the image display function of the display panel 5, a connector, an IC (integrated circuit) chip, and the like are provided on the back surface portion 5b of the display panel 5. That is, a device or the like other than the actuators 9 can be installed on the back surface portion 5b of the display panel 5.

For example, in the design including such other devices, the actuator 9 is attached at a position of a node of split vibration as much as possible. As a result, it is possible to suppress split vibration.

It goes without saying that the number and positions of drive points, i.e., the number and attachment positions of the actuators 9 are not limited and may be arbitrarily set.

[Reinforcing Member]

In order to suppress natural vibration (split vibration) of the display panel 5, a reinforcing member may be connected to the back surface portion 5*b* of the display panel 5. By increasing the strength of the display panel 5 with the reinforcing member, it is possible to suppress split vibration. Further, it is possible to increase the resonant frequency at which natural vibration occurs.

Further, it is also effective to use a strong aluminum substrate as the material of the display panel 5 (display substrate) itself. Further, the wiring configuration of the display substrate is designed such that a copper foil pattern is formed on the place where stress concentrates during natural vibration. For example, by widening the width of the copper foil pattern, the strength of the place where stress concentrates is reinforced.

As a result, it is possible to disperse the stress, etc. and suppress split vibration. For example, by widening the width of the copper foil pattern, it is also possible to reinforce the place where stress concentrates.

Figure 12:
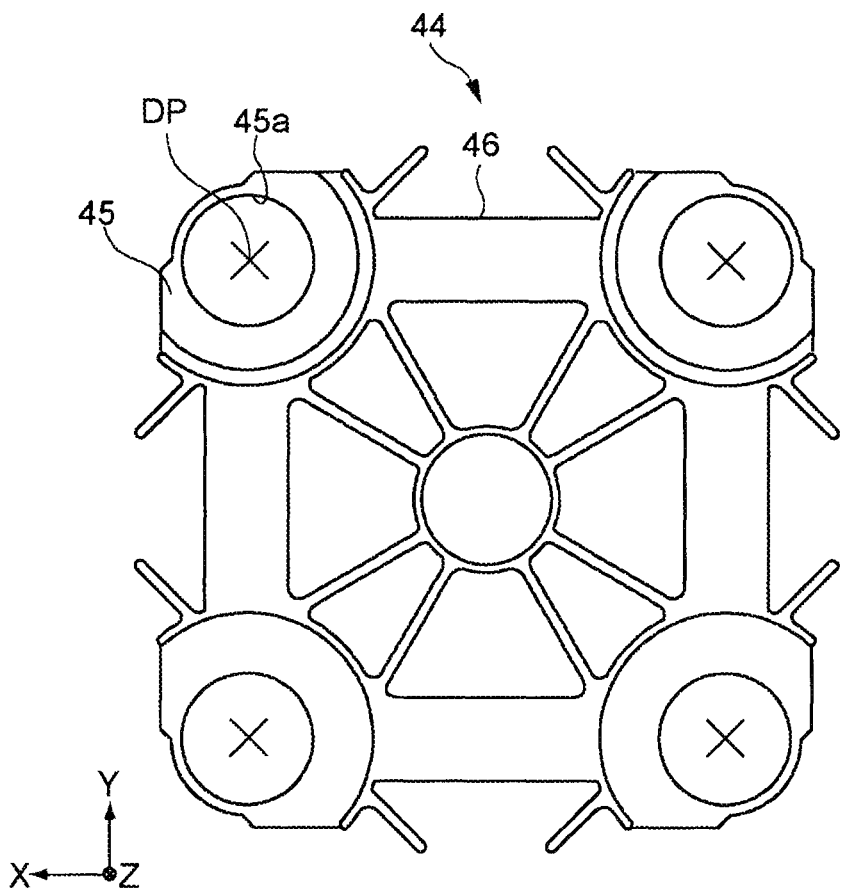
FIG. 12 is a schematic diagram showing a configuration example of a reinforcing member.

FIG. 12 is a schematic diagram showing a configuration example of a reinforcing member. FIG. 12 is a diagram of the reinforcing member as viewed from an orientation in which it is connected to the back surface portion 5*b* of the display panel 5.

A reinforcing member 44 includes a first reinforcing portion 45 and a second reinforcing portion 46.

The first reinforcing portion 45 includes a holding hole 45*a* and is connected to the back surface portion 5*b* of the display panel 5 at a position of a drive point DP. The actuator 9 to be attached at the position of the drive point DP is inserted into the holding hole 45*a*. That is, the first reinforcing portion 45 is configured to be capable of holding the periphery of the actuator 9.

In this way, by reinforcing the vicinity of the drive point DP set on the back surface portion 5*b* of the display panel 5, it is possible to increase the resonant frequency.

The second reinforcing portion 46 is configured to connect between the first reinforcing portions 45 while being spaced apart from the back surface portion 5*b* of the display panel 5. That is, a gap is formed between the second reinforcing portion 46 and the back surface portion 5*b*. The second reinforcing portion 46 functions as a beam-like reinforcing structure.

In this way, by forming a beam-like reinforcing structure connecting between a plurality of drive points DP, it is possible to increase the resonant frequency.

Further, a reinforcing structure is formed while being spaced apart from the back surface portion 5*b*. That is, a space (gap) is formed between the display panel 5 and the reinforcing structure. As a result, it is possible to suppress an excessive weight increase and improve the weight-to-efficiency. As a result, it is advantageous for increasing the resonant frequency.

Further, since the second reinforcing portion 46 is spaced apart from the display panel 5, it is possible to dispose another device such as a connector and an IC chip in the space. That is, it is possible to improve the degree of freedom in circuit configuration.

Further, the second reinforcing portion 46 is formed to face the position of a node of natural vibration that occurs in the display panel 5. Then, a vibration damping member formed of a material having a damping effect is interposed between the second reinforcing portion 46 and a vibration suppression point that is the position of the node of natural vibration. Such a configuration can also be realized, and it is possible to suppress components of natural vibration.

[Feedback Control]

Figure 13:
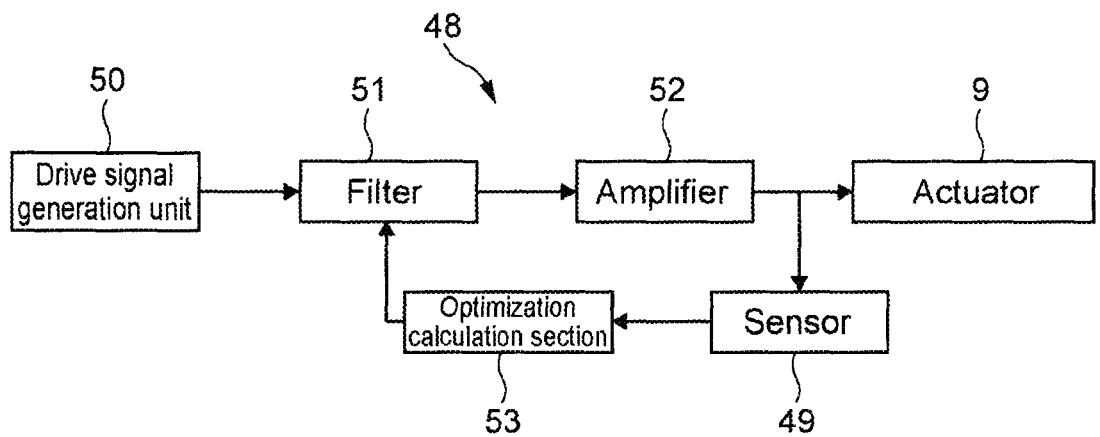
FIG. 13 is a schematic diagram showing a configuration example of a drive control section that drives an actuator.

FIG. 13 is a schematic diagram showing a configuration example of a drive control section that drives the actuator 9.

Figure 14A:
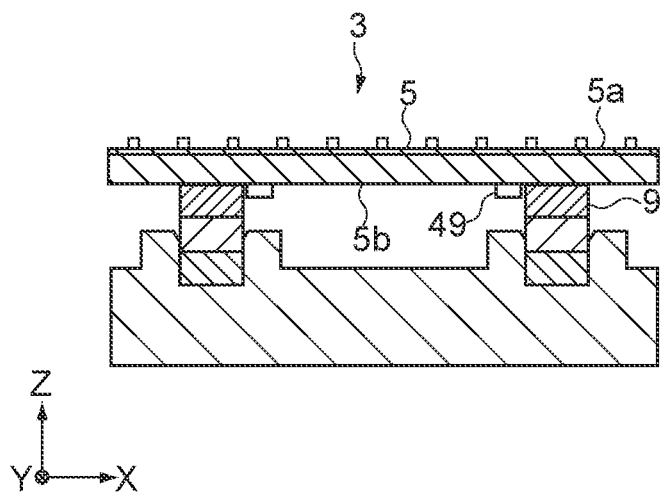
FIGS. 14A, 14B, and 14C are schematic diagrams showing an example of attaching a sensor to a display panel.
Figure 14B:
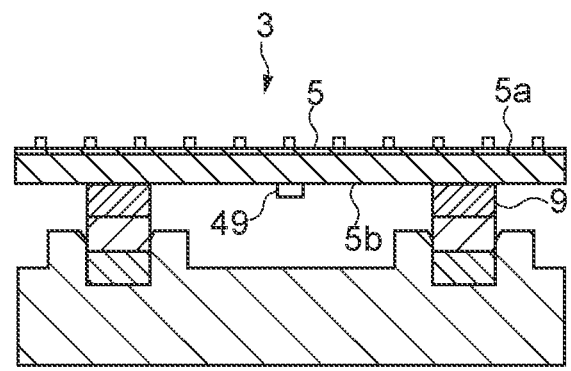
Figure 14C:
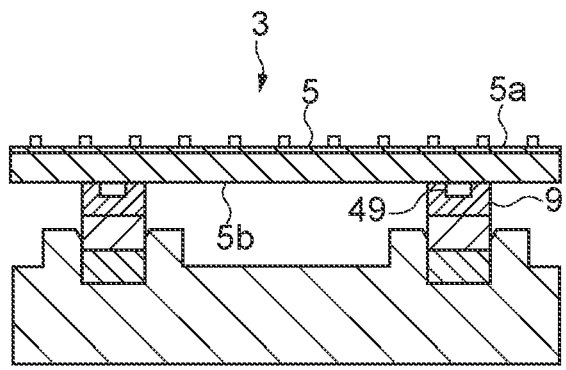

FIGS. 14A, 14B, and 14C are schematic diagrams showing an example of attaching a sensor to the display panel 5.

In this embodiment, feedback control based on the output of a sensor 49 can be executed by the drive control section 48.

The drive control section 48 includes a drive signal generation unit 50 that generates drive signals for driving the one or more actuators 9, a filter 51, an amplifier 52, and an optimization calculation section 53.

The respective blocks shown in FIG. 13 are realized by the control section 1 shown in FIG. 1. For example, the respective blocks shown in FIG. 13 may be realized as software blocks by executing a predetermined program by a processor such as a CPU. Alternatively, dedicated hardware such as an IC (integrated circuit) may be used.

The drive signal generation unit 50 generates drive signals for driving the actuators 9. For example, assumption is made that the plurality of actuators 9 is used for one display panel 5. In this case, the drive signal generation unit 50 generates drive signals synchronized with each other such that the actuators 9 generate vibration in the same phase and the same amplitude.

The filter 51 executes signal processing on the drive signal. For example, the filter 51 changes the gain of the drive signal and applies an offset.

The amplifier 52 outputs the drive signal processed by the filter 51 to the actuator 9.

The optimization calculation section 53 executes optimization calculation on the basis of the output of the sensor 49 and determines the filter characteristics of the filter 51.

The feedback control of the drive signal is executed on each actuator 9. That is, the filter 51, the amplifier 52, and the optimization calculation section 53 are capable of generating an optimum drive signal and outputting the generated drive signal to each actuator 9. Specifically, optimization of the drive signal is executed such that each actuator 9 generates vibration in the same phase and the same amplitude.

Note that regarding the signal processing by the filter 51, the amplification of the signal by the amplifier 52, and the optimization of the filter characteristics by the optimization calculation section 53, a specific algorithm or the like is not limited. An arbitrary algorithm or the like may be adopted.

For example, assumption is made that an acceleration sensor is used as the sensor 49. In this case, as shown in FIG. 14A, the sensor 49 is mounted on the back surface portion 5*b* of the display panel 5 in the vicinity of each actuator 9. As a result, it is possible to generate an optimum drive signal on the basis of the detection result of the sensor 49 and outputs the generated drive signal to each actuator 9.

Assumption is made that an IMU sensor including a multi-axis acceleration sensor and a multi-axis gyro sensor, or the like is used as the sensor 49. In this case, the sensor 49 can be disposed in the center of the back surface portion 5*b* of the display panel 5, or the like.

It is possible to generate an optimum drive signal on the basis of the output of the sensor 49 and outputs the generated drive signal to each actuator 9.

As shown in FIG. 14C, the actuator 9 and the sensor 49 can be integrally formed. For example, in the case where the electromagnetic actuator 9 as illustrated in FIG. 6, FIGS. 9A and 9B, or the like is used, the sensor 49 may be mounted in a hollow portion inside the drive bobbin 16.

It goes without saying that the electromagnetic actuator 9 is not necessarily need to be used, and the actuator 9 and the sensor 49 may be integrally formed even in the case where another type of actuator 9 is used. Further, an arbitrary configuration and method may be used as a configuration, method, and the like for integrally forming the actuator 9 and the sensor 49.

By integrally forming the actuator 9 and the sensor 49, it is possible to form a module including also the sensor 49. As a result, it is possible to significantly improve the workability regarding attaching the sensor 49.

In the sound generating mechanism according to the present technology, since the display panel 5 (display substrate) serves as the diaphragm in a normal speaker, the weight increases and the effects of gravity and the like that are constantly applied increase in some cases.

For example, in the case where the display section 2 is used with the Y direction shown in FIG. 2 and FIG. 3 as the vertical direction, the gravity of the display panel 5 acts in a direction perpendicular to the vibration direction (Z direction).

In the case where the display section 2 is used at an oblique angle from the vertical direction, the gravity direction of the display panel 5 and the vibration direction each actuator 9 obliquely intersect each other. Therefore, the plane direction of the plane connecting the central positions of vibration of the respective actuators 9 and the gravity direction of the display panel 5 also obliquely intersect each other.

In such a case, since the gravity component of the display panel 5 applied to each actuator 9 is not uniform, there is a possibility that rolling or the like occurs and vibration that occurs from each actuator 9 varies.

The drive control section 48 is formed as shown in FIG. 13 and feedback control of a drive signal is executed on the basis of the output of the sensor 49. As a result, it is possible to prevent vibration from varying due to the variation in gravity components applied to the respective actuators 9, for example. As a result, it is possible to stably and uniformly vibrate the display panel 5 and exhibit high acoustic characteristics.

Note that the sampling rate of the sensor 49 is set to be equivalent to the frame rate of driving by the actuator 9, i.e., the frame rate of an acoustic signal. As a result, it is possible to execute feedback control with high accuracy.

In the embodiment shown in FIGS. 13, 14A, 14B, and 14C, the sensor 49 function as a detection section that detects a vibration state of the display panel. Further, the drive control section 48 function as a drive control section that generates, on the basis of the detected vibration state of the display panel, a drive signal for driving each of the one or more actuators.

[Image/Sound Matching Control]

In this embodiment, it is possible to display an image by the display panel 5 and output sound by vibrating the display panel 5. Therefore, it is possible to execute, with high accuracy, image/sound matching control for displaying an image and outputting sound in synchronization with each other.

It is possible to easily output an image and sound in synchronization with each other, e.g., words are output from the mouth of the woman on the left side in accordance with the speaking action of the woman, words are output from the mouth of the man on the right side in accordance with the speaking action of the man, or sound of rubbing paper is output in accordance with the woman's action of picking up a letter on a desk, in the example shown in FIG. 2.

Further, it is also possible to vibrate the display panel 5 along the direction in which words are generated in accordance with the orientation in which the woman's face or the man's face is facing. It goes without saying that it is also possible to easily output sound of thunder outside a window by the display panel 5 that displays the window. In this way, it is possible to execute image/sound matching control with high accuracy and easily realize a high-quality application that outputs an image and sound.

Figure 15:
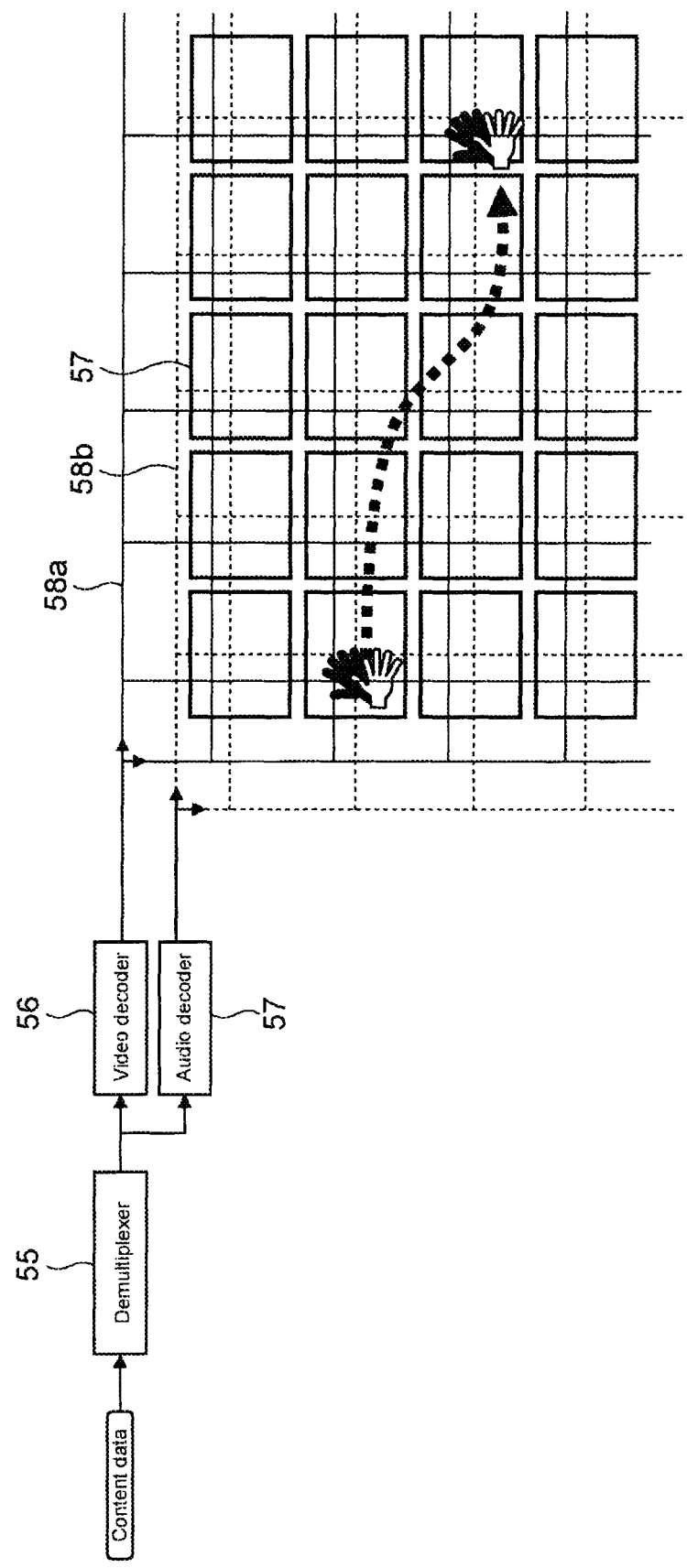
FIG. 15 is a schematic diagram showing system configuration example for executing image/sound matching control.

FIG. 15 is a schematic diagram showing a system configuration example for executing image/sound matching control.

The control section 1 shown in FIG. 1 forms a demultiplexer 55, a video decoder 56, and an audio decoder 57.

Further, the display section 2 forms a plurality of control units 57. The control unit 57 corresponds to one unit to be subjected to image/sound matching control. For example, image/sound matching control may be executed with the display unit 3 shown in FIG. 2 and FIG. 3 as one unit. In this case, one display unit 3 corresponds to one control unit 57.

Alternatively, image/sound matching control may be executed with the display panel 5 as one unit. In this case, one display panel 5 corresponds to one control unit 57.

Alternatively, image/sound matching control may be executed with an image element/acoustic element unit attached to the display panel 5 (display substrate) as the control unit 57. For example, it is conceivable that a predetermined plurality of display panels 5 is used as one control unit 57. Alternatively, a predetermined pixel region in the display panel 5 can be used as one control unit 57. In this case, a configuration in which the pixel region that is the control unit 57 can be vibrated may be adopted instead of uniformly vibrating the display panel 5.

Further, the control unit of image display and the control unit of sound output do not necessarily need to have a one-to-one correspondence. For example, the image display is executed in units of the display panel 5 and the sound output is executed in units of the display units 3. Such image/sound matching control is also possible.

The control section 1 receives content data. The demultiplexer 55 divides the content data into audio data and video data. The video decoder 56 and the audio decoder 57 respectively decode the video data and the audio data, and the pieces of decoded data are transmitted as a video output signal and an acoustic output signal to each control unit 57 formed in the display section 2 via signal lines 58a and 58b.

The video output signal and the acoustic output signal are individually transmitted to each control unit 57. As a result, for example, it is possible to easily transmit related sound data to the control unit 57 displaying video relating to sound.

It is possible to easily realize control such as outputting, in the case where the person displayed on the left side moves to the right while clapping his/her hands, an acoustic output signal including sound of clapping hands to the control unit 57 that outputs a video output signal of the person moving to the right, as illustrated in FIG. 15. Further, it is also possible to transmit a video output signal relating to the control unit 57 that outputs a video output signal of a person to the control unit 57 disposed in the periphery thereof. As a result, it is possible to easily realize image/sound matching control with high quality.

The video output signal can also be said to be an image signal. Further, the acoustic output signal can also be a sound signal. Further, a drive signal for driving the actuator 9 is generated on the basis of the acoustic output signal. It goes without saying that the drive signal may be generated as an acoustic output signal and output.

Figure 16:
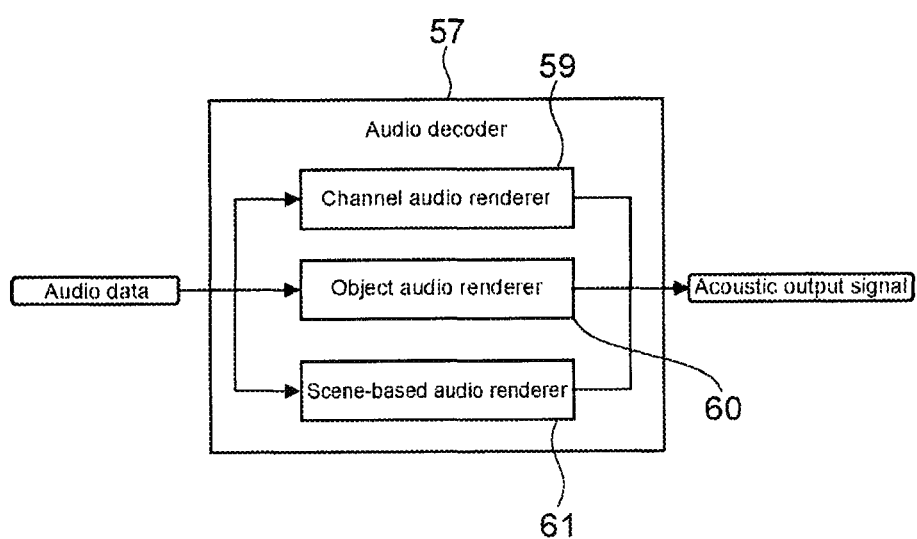
FIG. 16 is a block diagram showing a configuration example of an audio decoder.

FIG. 16 is a block diagram showing a configuration example of the audio decoder 57.

In the example shown in FIG. 16, a channel audio renderer 59, an object audio renderer 60, and a scene-based audio renderer 61 are formed. Therefore, the audio decoder 57 is capable of handling channel audio, object audio, and scene-based (Ambisonics) audio.

The channel audio renderer 59 generates, on the basis of channel audio received as audio data, an acoustic output signal to be output to each control unit 57. For example, it is possible to control, on the basis of an acoustic signal with reference to a channel included in channel audio, the output of an acoustic output signal according to an object (e.g., a person or an object) to be displayed.

The object audio renderer 60 generates, on the basis of object audio received as audio data, an acoustic output signal to be output to each control unit 57. For example, by separately processing an acoustic signal and metadata indicating a position, which are included in object audio, it is possible to control the output of an acoustic output signal according to an object (e.g., a person or an object) to be displayed.

The scene-based audio renderer 61 generates, on the basis of scene-based audio received as audio data, an acoustic output signal to be output to each control unit 57. For example, by processing an Ambisonics signal of the first or higher order included in scene-based audio, it is possible to control the output of an acoustic output signal according to an object (e.g., a person or an object) to be displayed.

It goes without saying that the audio decoder 57 is capable of handling also audio data of each format generated as 3D audio data. It is also possible to realize 3D spatial sound on the basis of 3D audio data.

Note that a relay substrate may be used for transmitting a video output signal and an acoustic output signal from the control section 1. Then, the display panel 5 and the relay substrate may be connected to each other by a flexible substrate, a harness, or the like. As a result, it is possible to transmit a video output signal and an acoustic output signal to the display panel 5 without disturbing vibration of the display panel 5.

The present technology can be applied to the relay substrate as part of the unit substrate 6 shown in FIG. 4 and the like. That is, the actuators 9 may be disposed between the relay substrate and the display panel 5 to drive the display panel 5.

[Friction Reduction Structure/Contact Area Reduction Structure]

Figure 17A:
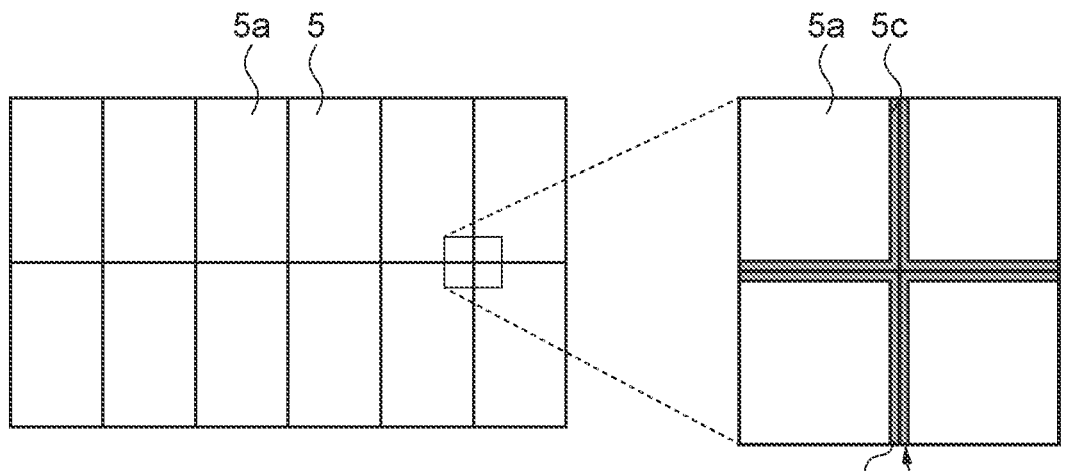
FIGS. 17A and 17B are schematic diagrams showing a configuration example of a friction reduction structure and a contact area reduction structure.
Figure 17B:
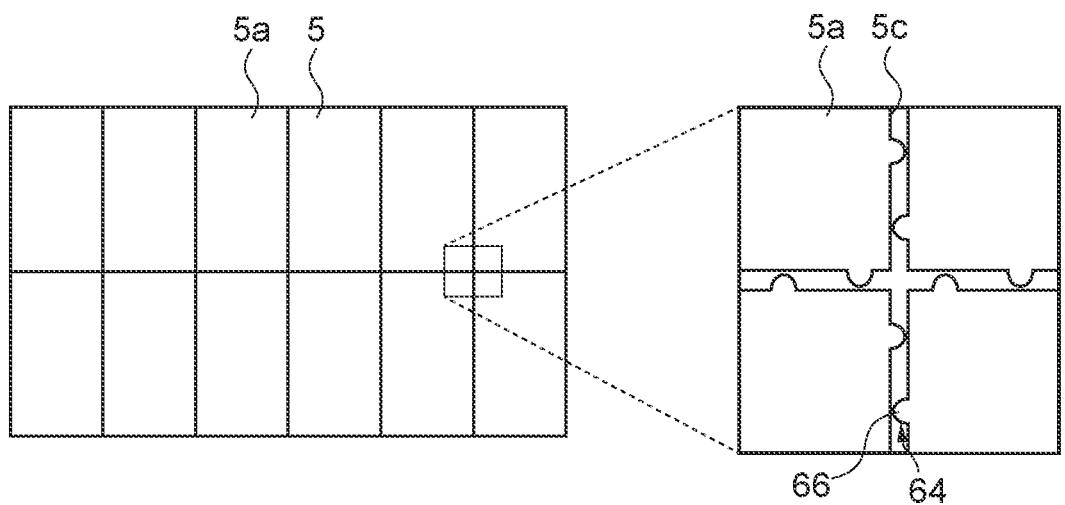

FIGS. 17A, 17B, and 17C are schematic diagrams showing a configuration example of a friction reduction structure and a contact area reduction structure.

As illustrated in FIGS. 17A, 17B, and 17C, assumption is made that the plurality of display panels 5 is used and the display surfaces 5a are two-dimensionally arranged. In such a case, for example, in the case where each the plurality of display panels 5 is individually driven to output sound, there is a possibility that problems such as abnormal noise and damage occur due to the contact between adjacent display panels 5.

That is, there is a possibility that a problem occurs due to the contact between the end surfaces 5c (see FIGS. 5A and 5B) adjacent to each other, of the display panels 5 adjacent to each other of the plurality of display panels 5.

In this regard, as shown in FIG. 17A, a structure for reducing friction (hereinafter, referred to as a friction reduction structure) 63 is formed between the end surfaces 5c adjacent to each other. Alternatively, as shown in FIG. 17B, a structure that reduces the contact area (hereinafter, referred to as a contact area reduction structure) 64 is formed between the end surfaces 5c adjacent to each other. As a result, it is possible to prevent problems such as generation of abnormal noise from occurring.

In the example shown in FIG. 17A, a low friction structure 63 is formed by coating the end surface 5c with a low friction material 65.

Examples of the low friction material 65 include PTFE (polytetrafluoroethylene). PTFE is a polymer of tetrafluoroethylene and is a fluoropolymer (fluorocarbon polymer) formed of only a fluorine atom and a carbon atom.

It goes without saying that the present technology is not limited thereto, and an arbitrary low friction material such as PPS (polyphenylene sulfide) may be used. Further, an arbitrary configuration other than coating with the low friction material 65 may be adopted as a configuration for realizing the low friction structure 63.

In the example shown in FIG. 17B, a contact area reduction structure 64 is formed by forming a projecting portion 66 on the end surface 5c. The shape, number, and the like of the projecting portions 66 are not limited, and may be arbitrarily designed. Further, an arbitrary configuration other than the formation of the projecting portion 66 may be adopted as a configuration for realizing the contact area reduction structure 64.

Further, the low friction structure 63 shown in FIG. 17A and the contact area reduction structure 64 shown in FIG. 17B may be combined. For example, the projecting portion 66 may be coated with the low friction material 65.

As described above, in the display apparatus 100 according to this embodiment, the one or more display panels 5 output an image. Further, the actuator section 7 is disposed between the display panel 5 and the support portion 8 of the unit substrate 6 and the display panel 5 is vibrated. As a result, it is possible to execute image/sound matching control with high accuracy and output an image and sound with high quality.

Further, in the display apparatus 100, the display panel 5 is supported by the unit substrate 6 via the actuator 9. Therefore, there is no portion that defines the relative position between the display panel 5 and the unit substrate 6 other than the portion including the actuator 9. As a result, it is possible to move the entire display panel 5 in parallel without disturbing vibration of the display panel 5 and realize reproduction of high-quality sound including wideband sound.

For example, assumption is made that a portion for supporting the display panel 5 is formed in addition to the portion including the actuator 9. In this case, since the supporting portion is fixed, the display panel 5 is vibrated while being partially bent. In this case, it is difficult to reproduce broadband sound. Further, in the case where bending occurs, also the directivity of sound becomes complicated. Therefore, in the case where the plurality of display panels 5 is used to output sound, complicated processing is necessary for adjusting the wavefront. Applying the present technology eliminates the necessity for such complicated processing.

Further, as described above, by suppressing split vibration (natural vibration), it is possible to prevent an extreme drop in sound pressure at a split vibration frequency (resonant frequency) and exhibit high acoustic characteristics.

In video content that combines video and sound, image/sound matching plays a very important role in the viewer's sense of immersion into the content. In a lot of content, it is desired to present sound such as actor's lines and sound effects such that the positions of the actors and effects in the video match the localization positions.

For this reason, in movie theaters, speakers are disposed so as to be suitable for reproducing the content. Specifically, in movie theaters, since video is projected onto a screen using a projector and the screen is capable of causing sound to pass therethrough, a method in which a speaker is disposed on the opposite side of the screen from the viewer and sound is reproduced through the screen is adopted.

Meanwhile, although an LED display (LED panel) capable of presenting video with high definition and wide dynamic range has been developed, this display cannot cause sound to pass therethrough unlike a screen and a speaker cannot be disposed in the same direction as the video presentation portion, making it difficult to achieve image/sound matching.

Further, the LED display is self-luminous and is capable of reducing deterioration in video quality due to the influence of the light source in surrounding environment as compared with the screen. Further, for the LED display, it is unnecessary to dispose an image projection device or the like that requires optical consideration, such as a projector. Therefore, it is a very useful device for applications to digital signage on the street, interactive content with viewers, and the like.

By applying the present technology, it is possible to execute image/sound matching control with high accuracy using an LED display. As a result, for example, it is possible to improve the sense of immersion into video content. Further, it is possible to improve the recognizability of the content, and the like.

Further, it is possible to achieve high advertising effects by digital signage. Further, it is possible to realize telework (telecommuting) and the like with high quality. In addition, it is possible to provide a high-quality application that outputs an image and sound.

Further, since there is nothing to attenuate the sound or disturb the wavefront, such as screens used in movie theaters, it is possible to generate an arbitrary wavefront and realize a new sound field expression that has not existed in the past.

Other Embodiments

The present technology is not limited to the embodiment described above, and various other embodiments can be realized.

An output apparatus according to the present technology and another output apparatus capable of outputting an image, sound, and the like may be capable of operating in cooperation with each other. Further, an output device capable of outputting an image, sound, and the like may be separately mounted in an output apparatus according to the present technology, and operations may be executed in cooperation with each other.

For example, an external speaker that can be communicably connected to an output apparatus according to the present technology and the output apparatus according to the present technology are caused to operate in cooperation with each other. Alternatively, a speaker incorporated in an output apparatus according to the present technology and one or more display panels capable of outputting sound by vibration according to the present technology are caused to operate in cooperation with each other.

As a result, it is possible to realize realistic sound output and the like, and provide a high-quality viewing experience.

The fields, devices, and the like to which the present technology can be applied are not limited. For example, the present technology is applicable to an arbitrary device capable of outputting an image and sound, which is used in an arbitrary field, such as a replacement for a screen for a movie theater, digital signage, a home television, and various display devices.

The display apparatus 100 according to this embodiment can also be referred to as a video presentation apparatus or a sound presentation apparatus. Further, it can also be referred to as a signal processing apparatus, focusing on the fact that it executes signal processing for outputting an image and sound.

The display apparatus, the display unit, the display panel, the actuator, the unit substrate, the connection mechanism, the fixing mechanism, the frame member, the reinforcing member, each configuration such as a system configuration after image/sound matching, and flows of feedback control, image/sound matching control, and the like described with reference to the drawings are merely an embodiment, and can be arbitrarily modified without departing from the essence of the present technology. That is, another arbitrary configuration, algorithm, and the like for implementing the present technology may be adopted.

In the present disclosure, in the case where the word "substantially" is used, it is used only to facilitate the understanding of description, and the use/non-use of the word "substantially" has no special meaning.

That is, in the present disclosure, concepts defining a shape, a size, a positional relationship, a state, and the like, such as "central", "middle", "uniform", "equal", "the same", "orthogonal", "parallel", "symmetrical", "extended", "axial direction", "columnar shape", "cylindrical shape", "ring shape", and "annular shape", are concepts including "substantially central", "substantially middle", "substantially uniform", "substantially equal", "substantially the same", "substantially orthogonal", "substantially parallel", "substantially symmetrical", "substantially extended", "substantially axial direction", "substantially columnar shape", "substantially cylindrical shape", "substantially ring shape", "substantially annular shape", and the like.

For example, a state included in a predetermined range (e.g., a range of ±10%) based on "completely central", "completely middle", "completely uniform", "completely equal", "completely the same", "completely orthogonal", "completely parallel", "completely symmetrical", "completely extended", "completely axial direction", "completely columnar shape", "completely cylindrical shape", "completely ring shape", "completely annular shape", and the like is also included.

Therefore, even in the case where the word "substantially" is not added, a concept expressed by adding a so-called "substantially" can be included. On the contrary, the complete state is not excluded from the state expressed by adding "substantially".

In the present disclosure, expressions using "than" such as "larger than A" and "smaller than A" comprehensively include both the concept including the case where it is equivalent to A and the concept not including the case where it is equivalent to A. For example, the phrase "larger than A" is not limited to the case not including being equivalent to A and includes "A or more". Further, the phrase "smaller than A" is not limited to "less than A" and includes "A or less".

When implementing the present technology, it only needs to adopt specific settings and the like from the concepts included in "larger than A" and "smaller than A" such that the effects described above are exhibited.

Of the feature portions according to the present technology described above, at least two feature portions can be combined. That is, the various characteristic portions described in the respective embodiments may be arbitrarily combined with each other without distinguishing the respective embodiments from each other. Further, the various effects described above are merely illustrative and are not limitative, and other effects may be exhibited.

It should be noted that the present technology may also take the following configurations.

(1) An output apparatus, including:
one or more display panels capable of displaying an image;
a support member that includes a support portion for supporting the respective one or more display panels; and
an actuator section that is disposed between the one or more display panels and the support portion and vibrates the respective one or more display panels.

(2) The output apparatus according to (1), in which
the support member supports the one or more display panels via the actuator section.

(3) The output apparatus according to (2), in which
each of the one or more display panels has a display surface for displaying the image and a back surface portion on a side opposite to the display surface,
the actuator section includes one or more actuators that are prepared for the respective one or more display panels and are connected to the back surface portion of the respective one or more display panels, and
the support portion fixes and holds the one or more actuators.

(4) The output apparatus according to (3), further including
a fixing mechanism for fixing the one or more actuators to the support portion.

(5) The output apparatus according to (4), in which
the fixing mechanism includes a fastening member, and
the one or more actuators are fixed to the support portion by fastening with the fastening member.

(6) The output apparatus according to (4) or (5), in which
the fixing mechanism includes a magnet, and
the one or more actuators are fixed to the support portion by magnetic force of the magnet.

(7) The output apparatus according to any one of (3) to (6), in which
the one or more actuators are each an electromagnetic actuator, a piezoelectric actuator, or a magnetostrictive actuator.

(8) The output apparatus according to any one of (3) to (7), in which
the one or more actuators are each an electromagnetic actuator that includes a magnetic circuit, and
the fixing mechanism includes a magnet that is connected to the electromagnetic actuator and has an orientation of a magnetic pole set in accordance with a configuration of the magnetic circuit.

(9) The output apparatus according to (8), in which
the magnet connected to the electromagnetic actuator constitutes the magnetic circuit.

(10) The output apparatus according to any one of (3) to (9), further including
a connection mechanism for connecting the one or more actuators to the display panel.

(11) The output apparatus according to (10), in which
the one or more actuators are each an electromagnetic actuator and each include a coil and a bobbin around which the coil is wound, and
the connection mechanism includes a connection member for connecting the bobbin to the display panel.

(12) The output apparatus according to any one of (3) to (11), in which
the one or more actuators are each formed to be attachable/detachable to/from the display panel.

(13) The output apparatus according to any one of (3) to (12), in which
the one or more actuators include a plurality of actuators, and
the actuator section includes a frame member that holds the plurality of actuators in a predetermined positional relationship.

(14) The output apparatus according to (13), in which
each of the plurality of actuators is attachably/detachably screwed to the back surface portion of the display panel, and
the frame member rotatably holds the plurality of actuators.

(15) The output apparatus according to any one of (3) to (14), in which
the one or more actuators are each connected to a position of a node of natural vibration generated in the display panel.

(16) The output apparatus according to any one of (1) to (15), further including
a reinforcing member connected to the back surface portion of the display panel.

(17) The output apparatus according to any one of (1) to (16), further including:
a detection section that detects a vibration state of the display panel; and
a drive control section that generates, on the basis of the detected vibration state of the display panel, a drive signal for driving each of the one or more actuators.

(18) The output apparatus according to any one of (1) to (17), in which
the one or more display panels include a plurality of display panels having display surfaces for displaying the image, the display surfaces being two-dimensionally arranged, and
a structure for reducing friction is formed between end surfaces adjacent to each other, of display panels adjacent to each other of the plurality of display panels.

(19) The output apparatus according to any one of (1) to (18), in which
the one or more display panels include a plurality of display panels having display surfaces for displaying the image, the display surfaces being two-dimensionally arranged, and
a structure that reduces a contact area is formed between end surfaces adjacent to each other, of display panels adjacent to each other of the plurality of display panels.

(20) The output apparatus according to any one of (1) to (19), further including
a plurality of display units each including the one or more display panels, the actuator section, and the support member.

(21) The output apparatus according to (18), wherein
the structure for reducing friction is formed by coating the end surface with a low friction material.
(22) The output apparatus according to (19), wherein
the structure that reduces the contact area is formed by forming a projecting portion on the end surface.
(23) The output apparatus according to any one of (1) to (22), wherein
the one or more display panels are each an LED panel.

REFERENCE SIGNS LIST 3 display unit
5 display panel
5a display surface
5b back surface portion
5c end surface
6 unit substrate
7 actuator
8 support portion
9 actuator
12 fixing unit
13 movable unit
15 voice coil
16 drive bobbin
18 screw hole
19 connection member
39 frame member
44 reinforcing member
48 drive control section
49 sensor
63 low friction structure
64 structure that reduces the contact area
65 low friction material
66 projecting portion
100 display apparatus

The invention claimed is:

1. An output apparatus, comprising:
at least one display panel configured to display an image;
a support member that includes a support portion configured to support the at least one display panel;
an actuator section between the at least one display panel and the support portion, wherein
the actuator section is configured to vibrate the at least one display panel, and
the actuator section includes at least one actuator;
a detection section configured to detect a vibration state of the at least one display panel; and
a drive control section configured to:
generate a drive signal based on the detected vibration state; and
drive the at least one actuator based on the generated drive signal.

2. The output apparatus according to claim 1, wherein the support member is configured to support the at least one display panel via the actuator section.

3. The output apparatus according to claim 2, wherein
the at least one display panel includes a display surface and a back surface portion,
the back surface portion is on a side opposite to the display surface,
the at least one display panel is configured to display the image on the display surface,
the at least one actuator is connected to the back surface portion of the at least one display panel, and
the support portion is configured to fix and hold the at least one actuator.

4. The output apparatus according to claim 3, further comprising a fixing mechanism configured to fix the at least one actuator to the support portion.

5. The output apparatus according to claim 4, wherein
the fixing mechanism includes a fastening member, and
the fastening member is configured to fix the at least one actuator to the support portion.

6. The output apparatus according to claim 4, wherein
the fixing mechanism includes a magnet, and
the magnet is configured to fix the at least one actuator to the support portion based on a magnetic force of the magnet.

7. The output apparatus according to claim 3, wherein the at least one actuator includes at least one of an electromagnetic actuator, a piezoelectric actuator, or a magnetostrictive actuator.

8. The output apparatus according to claim 3, further comprising a fixing mechanism that includes a magnet, wherein
the at least one actuator is an electromagnetic actuator that includes a magnetic circuit,
the magnet is connected to the electromagnetic actuator, and
an orientation of a magnetic pole of the magnet is based on a configuration of the magnetic circuit.

9. The output apparatus according to claim 8, wherein the magnetic circuit includes the magnet.

10. The output apparatus according to claim 3, wherein the at least one actuator is detachably attached to the at least one display panel.

11. The output apparatus according to claim 3, further comprising a plurality of actuators that includes the at least one actuator, wherein the actuator section further include a frame member configured to hold each of the plurality of actuators in a specific positional relationship.

12. The output apparatus according to claim 11, wherein
each of the plurality of actuators is detachably screwed to the back surface portion of the at least one display panel, and
the frame member is further configured to rotatably hold the plurality of actuators.

13. The output apparatus according to claim 3, wherein the at least one actuator is connected to a position corresponding to a node of natural vibration in the display panel.

14. The output apparatus according to claim 1, further comprising a connection mechanism configured to connect the at least one actuator to the at least one display panel.

15. The output apparatus according to claim 14, wherein
the at least one actuator is an electromagnetic actuator that includes a coil and a bobbin around which the coil is wound, and
the connection mechanism includes a connection member configured to connect the bobbin to the at least one display panel.

16. The output apparatus according to claim 1, further comprising a reinforcing member connected to a back surface portion of the at least one display panel.

17. The output apparatus according to claim 1, further comprising a plurality of display panels that includes a plurality of display surfaces, wherein
the plurality of display panels is configured to display the image on the plurality of display surfaces;
the plurality of display surfaces is in a two-dimensional arrangement,
each of adjacent display panels includes a structure configured to reduce friction between end surfaces of the adjacent display panels, and the plurality of display panels further includes the adjacent display panels and the at least one display panel.

18. The output apparatus according to claim 1, further comprising a plurality of display panels that includes a plurality of display surfaces, wherein
the plurality of display panels is configured to display the image on the plurality of display surfaces,
the plurality of display surfaces is in a two-dimensional arrangement arranged,
each of adjacent display panels includes a structure configured to reduce a contact area between end surfaces of the adjacent display panels, and
the plurality of display panels includes the adjacent display panels and the at least one display panel.

19. The output apparatus according to claim 1, further comprising a plurality of display units, wherein each of the plurality of display units includes the at least one display panel, the actuator section, and the support member.

20. An output apparatus, comprising:
a plurality of display panels that includes:
adjacent display panels; and
a plurality of display surfaces, wherein
the plurality of display panels is configured to display an image on the plurality of display surfaces, and
each of the adjacent display panels includes a structure configured to reduce friction between end surfaces of the adjacent display panels;
a support member that includes a support portion configured to support at least one display panel of the plurality of display panels; and
an actuator section between the at least one display panel and the support portion, wherein the actuator section is configured to vibrate the at least one display panel.

* * * * *